(12) United States Patent
Tripathi et al.

(10) Patent No.: US 11,323,944 B2
(45) Date of Patent: May 3, 2022

(54) VIRTUAL TRACKING OR REGISTRATION AREAS FOR NON TERRESTRIAL NETWORKS

(71) Applicant: Samsung Electronics Co., Ltd., Suwon-si (KR)

(72) Inventors: Nishith D. Tripathi, Parker, TX (US); Kyeongin Jeong, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/030,146

(22) Filed: Sep. 23, 2020

(65) Prior Publication Data

US 2021/0105693 A1    Apr. 8, 2021

Related U.S. Application Data

(60) Provisional application No. 62/912,408, filed on Oct. 8, 2019, provisional application No. 62/929,693, filed
(Continued)

(51) Int. Cl.
*H04W 36/30* (2009.01)
*H04W 4/029* (2018.01)
(Continued)

(52) U.S. Cl.
CPC ........ *H04W 36/30* (2013.01); *H04W 4/029* (2018.02); *H04W 4/06* (2013.01); *H04W 24/10* (2013.01); *H04W 76/27* (2018.02); *H04W 84/06* (2013.01)

(58) Field of Classification Search
CPC ....... H04W 36/30; H04W 4/029; H04W 4/06; H04W 76/27; H04W 24/10; H04W 84/06; H04W 36/0094

USPC ......................................................... 455/436
See application file for complete search history.
(Continued)

(56) References Cited

U.S. PATENT DOCUMENTS 10,177,837 B2    1/2019  Ravishankar et al.
2018/0098261 A1  4/2018  Wang et al.
(Continued)

FOREIGN PATENT DOCUMENTS

WO    2016/169473 A1    10/2016
WO    WO-2020194257 A1 * 10/2020    ...... H04W 36/00835

OTHER PUBLICATIONS

International Search Report dated Jan. 5, 2021 in connection with International Patent Application No. PCT/KR2020/013276, 4 pages.
(Continued)

*Primary Examiner* — Hirdepal Singh

(57) ABSTRACT

A method and apparatus in a wireless communication system is provided. The method and apparatus comprises: identifying a virtual tracking area (VTA) to tracking area (TA) (VTA-TA) mapping information indicating mappings between (i) TA identifiers (TAIs) associated with a non-terrestrial network (NTN) entity and (ii) VTAs associated with geographical areas as a function of time; identifying one or more TAIs at an instant or during a time period based on the VTA-TA mapping information; transmitting a radio resource control (RRC) request message including the one or more TAIs; and receiving an RRC response message corresponding to the RRC request message based on the one or more TAIs. The RRC response message includes a virtual registration area (VRA).

17 Claims, 22 Drawing Sheets

Related U.S. Application Data on Nov. 1, 2019, provisional application No. 62/937,310, filed on Nov. 19, 2019, provisional application No. 62/989,333, filed on Mar. 13, 2020, provisional application No. 63/002,779, filed on Mar. 31, 2020, provisional application No. 62/910,812, filed on Oct. 4, 2019.

(51) Int. Cl.
*H04W 4/06* (2009.01)
*H04W 76/27* (2018.01)
*H04W 24/10* (2009.01)
*H04W 84/06* (2009.01)

(56) References Cited

U.S. PATENT DOCUMENTS

| | | |
|---|---|---|
| 2018/0376321 A1 | 12/2018 | Jin et al. |
| 2019/0207676 A1 | 7/2019 | Noerpel et al. |
| 2020/0213000 A1* | 7/2020 | Arur ............... H04B 7/1851 |
| 2021/0105788 A1* | 4/2021 | Kim ............... H04W 76/14 |
| 2021/0212013 A1* | 7/2021 | Chen ............... H04W 64/00 |
| 2021/0235416 A1* | 7/2021 | Dou ............... H04W 16/28 |

OTHER PUBLICATIONS

3GPP TS 22.261 V17.3.0 (Jul. 2020), Technical Specification, "3rd Generation Partnership Project; Technical Specification Group Services and System Aspects; Service requirements for the 5G system; Stage 1 (Release 17)", Jul. 2020, 83 pages.

3GPP TR 38.811 V15.3.0 (Jul. 2020), Technical Report, "3rd Generation Partnership Project; Technical Specification Group Radio Access Network; Study on New Radio (NR) to support non-terrestrial networks (Release 15)", Jul. 2020, 126 pages.

3GPP TR 22.822 V16.0.0 (Jun. 2018), Technical Report, "3rd Generation Partnership Project; Technical Specification Group Services and System Aspects; Study on using Satellite Access in 5G; Stage 1 (Release 16)", Jun. 2018, 35 pages.

\* cited by examiner

VIRTUAL TRACKING OR REGISTRATION AREAS FOR NON TERRESTRIAL NETWORKS

CROSS-REFERENCE TO RELATED APPLICATIONS AND CLAIM OF PRIORITY

The present application claims priority to:
U.S. Provisional Patent Application Ser. No. 62/910,812, filed on Oct. 4, 2019;
U.S. Provisional Patent Application Ser. No. 62/912,408, filed on Oct. 8, 2019;
U.S. Provisional Patent Application Ser. No. 62/929,693, filed on Nov. 1, 2019;
U.S. Provisional Patent Application Ser. No. 62/937,310, filed on Nov. 19, 2019;
U.S. Provisional Patent Application Ser. No. 62/989,333, filed on Mar. 13, 2020; and
U.S. Provisional Patent Application Ser. No. 63/002,779, filed on Mar. 31, 2020. The content of the above-identified patent document is incorporated herein by reference.

TECHNICAL FIELD

The present disclosure relates generally to non terrestrial networks and, more specifically, the present disclosure relates to virtual tracking areas or registration areas for the non terrestrial networks.

BACKGROUND

A $5^{th}$ generation (5G) user equipment (UE) needs to perform a registration update when the 5G UE detects a tracking area (TA) that is not in the registration area (RA). The RA includes a set of TAs specified by the TA identity (TAI) list. For non-geostationary (GEO) satellites with moving non terrestrial network (NTN) cells and moving TAs on the ground, excessive registration updates occur if $3^{rd}$ generation partnership project release-15 (3GPP R15)-like mechanisms are reused.

SUMMARY

The present disclosure generally relates to non terrestrial networks and, more specifically, the present disclosure relates to virtual tracking areas or registration areas for the non terrestrial networks.

In one embodiment, a user equipment (UE) in a wireless communication system is provided. The UE comprises a processor configured to identify virtual tracking area (VTA) to tracking area (TA) (VTA-TA) mapping information indicating mappings between (i) TA identifiers (TAIs) associated with a non-terrestrial network (NTN) entity and (ii) VTAs associated with geographical areas as a function of time; and identify one or more TAIs at an instant or during a time period based on the VTA-TA mapping information. The UE further comprises a transceiver operably connected to the processor, the transceiver configured to: transmit a radio resource control (RRC) request message including the one or more TAIs; and receive an RRC response message corresponding to the RRC request message based on the one or more TAIs, wherein the RRC response message includes a virtual registration area (VRA).

In another embodiment, a base station (BS) in a wireless communication system is provided. The BS comprises a processor and a transceiver operably connected to the processor. The transceiver is configured to receive, from a UE, an RRC request message including one or more TAIs identified at an instant or during a time period based on VTA-TA mapping information that indicates mappings between (i) TAIs associated with a NTN entity and (ii) VTAs associated with geographical areas as a function of time. The transceiver is configured to transmit, to the UE, an RRC response message corresponding to the RRC request message based on the one or more TAIs, wherein the RRC response message includes a VRA. The RRC request message and the RRC response message include a non-access stratum (NAS) signaling message.

In yet another embodiment, a method of a UE in a wireless communication system is provided. The method comprises: identifying VTA-TA mapping information indicating mappings between (i) TAIs associated with a NTN entity and (ii) VTAs associated with geographical areas as a function of time; identifying one or more TAIs at an instant or during a time period based on the VTA-TA mapping information; transmitting a RRC request message including the one or more TAIs; and receiving an RRC response message corresponding to the RRC request message based on the one or more TAIs. The RRC response message includes a VRA.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
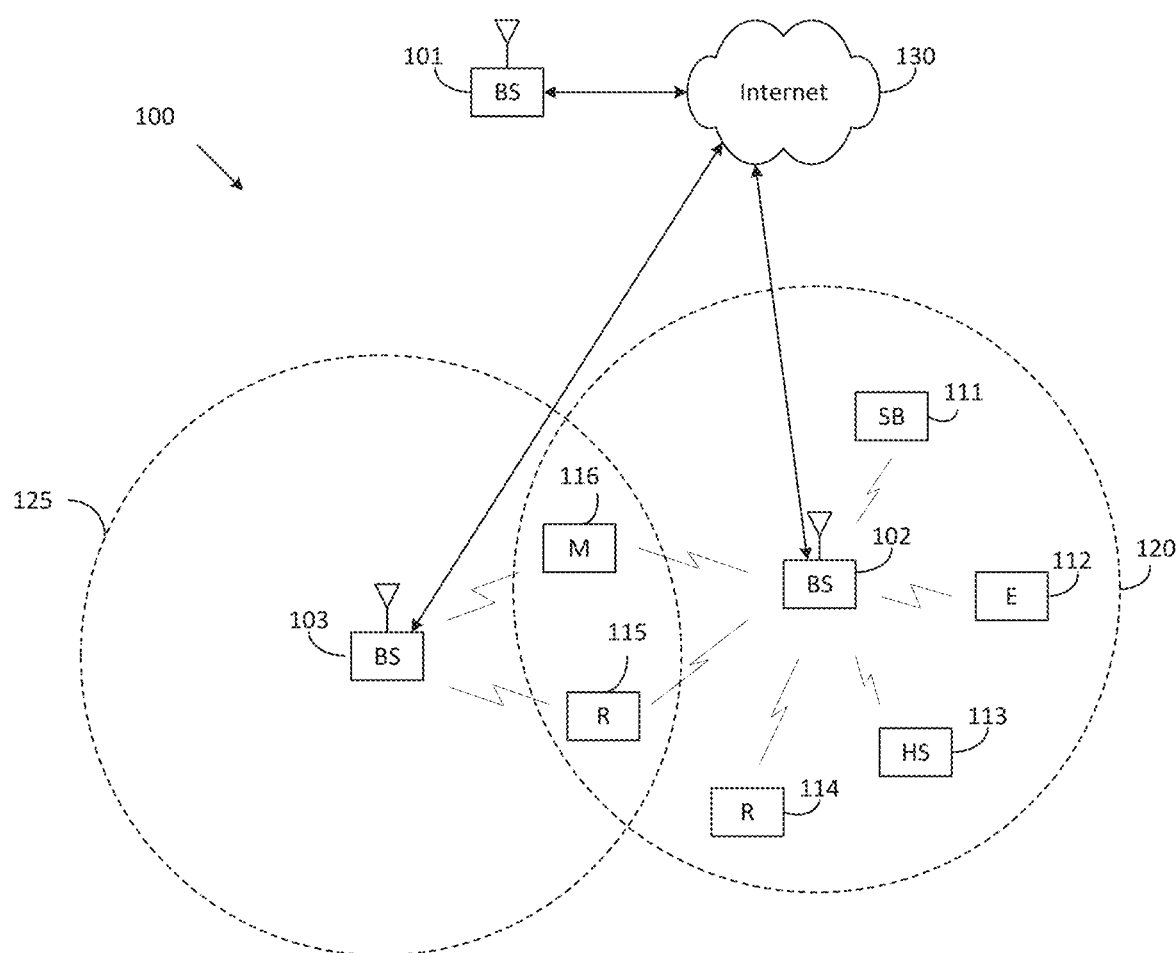
FIG. 1 illustrates an example wireless network according to embodiments of the present disclosure.
Figure 2:
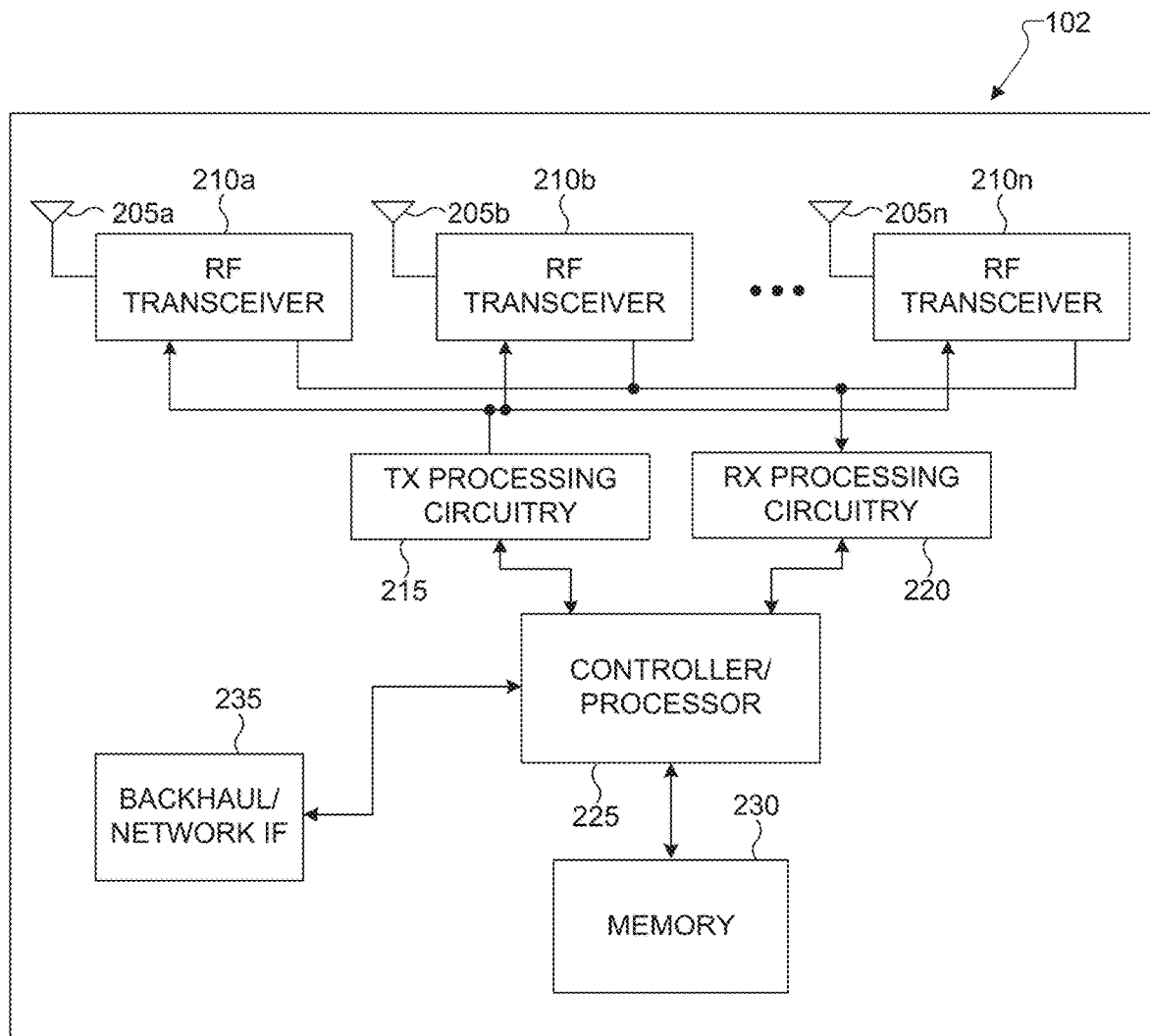
FIG. 2 illustrates an example gNB according to embodiments of the present disclosure.
Figure 3:
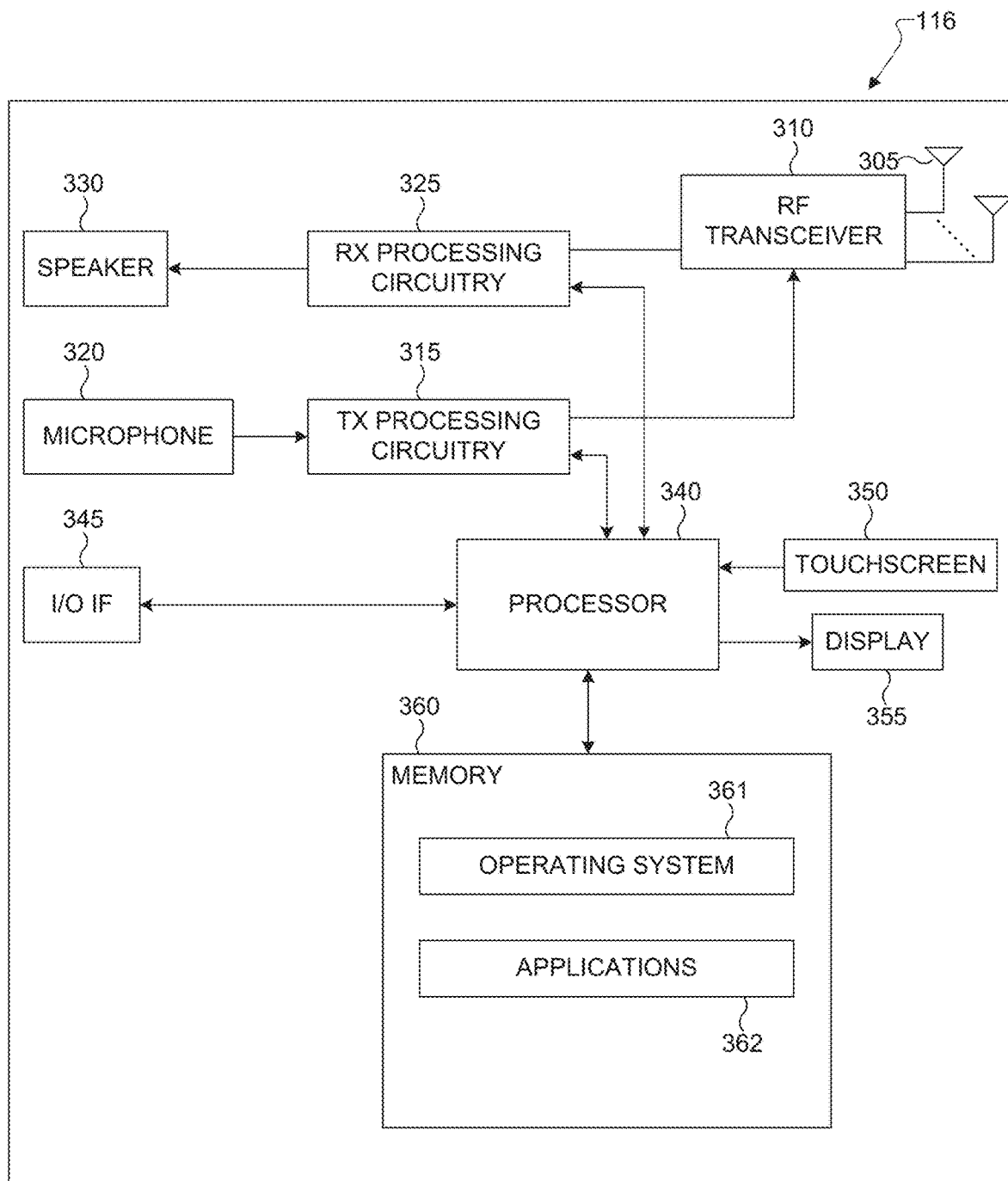
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an evolved base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," "user device," or an Internet-of-Things (IoT) device. For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof. In certain embodiments, and one or more of the gNBs 101-103 includes circuitry, programing, or a combination thereof.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward or downlink channel signals and the transmission of reverse or uplink channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

The present disclosure defines the concept of fixed-earth VTAs or VRAs to completely avoid 5G registration updates resulting from moving tracking areas in a non terrestrial network (NTN). This disclosure enables reuse of 3GPP release 15 (R15) mechanisms related to registration while reducing the amount of radio interface and non access stratum (NAS) signaling and reduces the amount of processing needed at satellites, the NTN UE, and the network.

A 5G UE needs to perform a registration update when the 5G UE detects a tracking area (TA) that is not in the registration area (RA). The RA includes a set of TAs specified by the TA identity (TAI) List. For non-GEO satellites with moving NTN cells and moving TAs on the ground, excessive registration updates occur if 3GPP R15-like mechanisms are reused. This disclosure describes an approach that eliminates registrations resulting from moving TAs. The disclosure makes minimal changes to the 3GPP R15 mechanisms while reducing the signaling and processing requirements.

When a UE is in the idle mode, the UE does not have a dedicated radio connection with the radio network. Hence, a location of UE is not known by any base station (i.e., eNB in LTE or gNB in 5G). However, the core network is aware of the UE's location at the granularity of a tracking area. Hence, if there is incoming data, the network sends a page message to the UE in the tacking areas (TAs), where the UE is considered "registered" by the network. The UE can exit the idle mode to do data transfer.

The set of TAs where the UE is considered to be registered is called registration area (RA) in 5G. The RA is defined by the TAI List including one or more TAs. The idle mode UE observes the tracking area identity (TAI) being transmitted by the cell that the UE is monitoring. If a UE encounters a TAI that is not in a registration area (RA) (e.g., due to UE mobility), the UE performs a tracking area update in LTE or a registration update in 5G to inform the network about a new location. The network now considers the UE registered in a new RA.

In case of an NTN, where the NTN cells and associated TAIs transmitted by a satellite keep changing, a stationary UE sees moving TAIs on the ground. Hence, although the UE has not moved, the TAI has changed. This requires the UE to perform a TAU or RU. In summary, moving TAs cause excessive registrations in 5G or tracking area updates (TAUs) in LTE.

The present disclosure defines stationary (i.e., earth-fixed) virtual tracking areas for NTNs. These VTAs are analogous to traditional TAs of terrestrial networks (TNs) in that their boundaries remain fixed and do not move even as NTN cells of satellites move. Similar to a TN cell in an R15 TN, the satellite can transmit a TAI in an NTN cell, which remains the same all the time, regardless of the geographic area the satellite is covering at a given instant. The relationship between the VTA and the TAI depends on the specific time. Based on the VTA-TA mapping that is known to the UE (and the network), the UE knows if the UE's VTA has changed or not. If the UE is stationary, TAIs being received by the UE keep changing because different (non-GEO) satellites transmit different NTN cells and hence different TAIs in the given geographic area. However, since the UE knows the time-based VTA-TA mapping, the UE knows about the TAIs that are part of the VRA and the UE can decide whether to do registration update or not by checking if the observed TAI(s) is/are part of the VRA at a given instant. Only when VRA changes due to the UE mobility, the UE would perform mobility-based registration update. In summary, due to the definition of VTAs that are earth-fixed, the problem of excessive registrations is solved by this disclosure.

Figure 4:
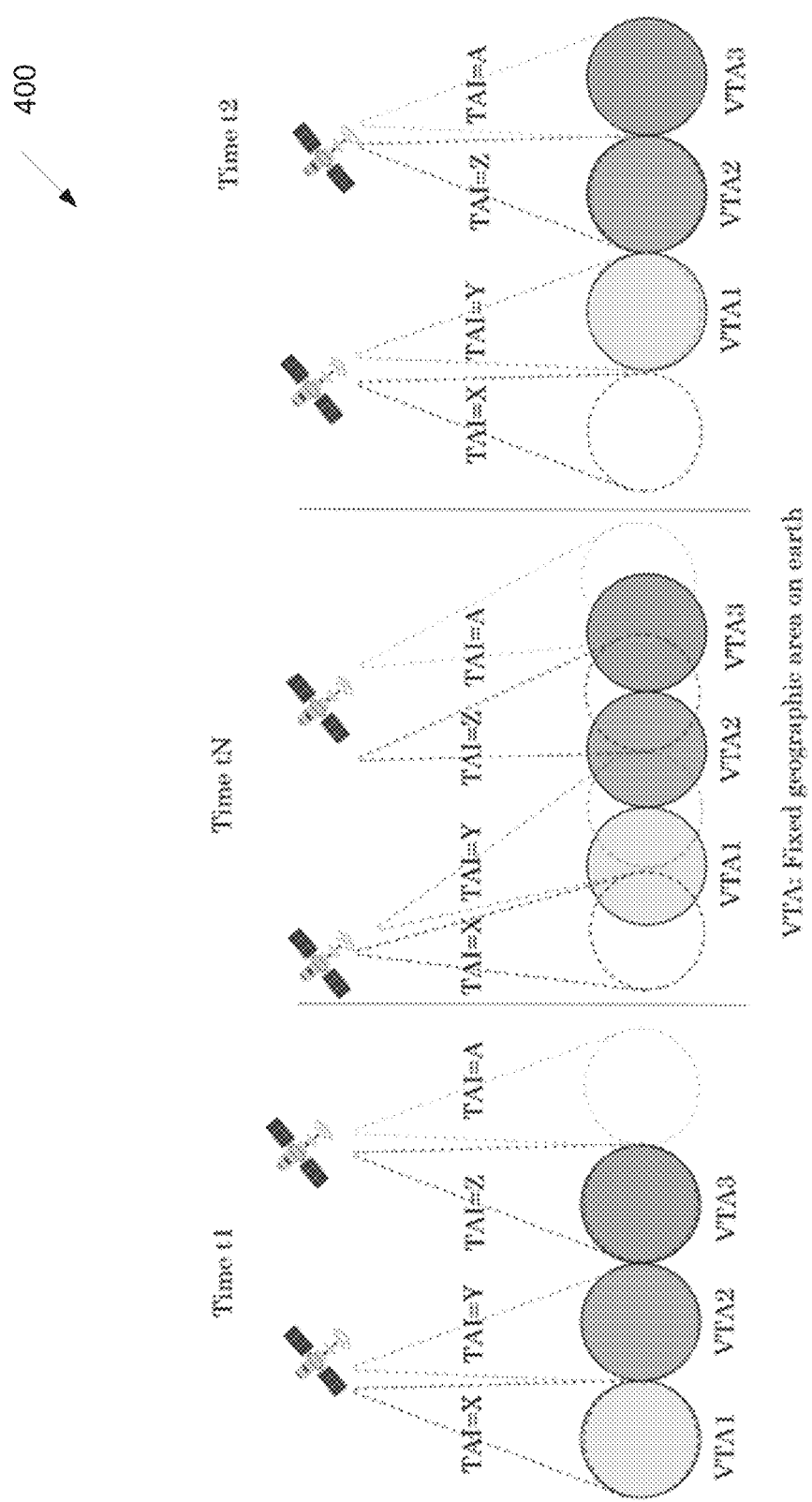
FIG. 4 illustrates an example virtual tracking areas (VTAs) according to embodiments of the present disclosure.

FIG. 4 illustrates an example of virtual tracking areas (VTAs) 400 according to embodiments of the present disclosure. An embodiment of the VTAs 400 shown in FIG. 4 is for illustration only. One or more of the components illustrated in FIG. 4 can be implemented in specialized circuitry configured to perform the noted functions or one or more of the components can be implemented by one or more processors executing instructions to perform the noted functions. FIG. 4 shows an example of the concept of fixed-earth VTAs and moving TAs.

In this example, a satellite beam is associated with a moving NTN cell and hence a moving TA. The satellite beams and TAs are moving from right to left in FIG. 4. In the example shown below, each NTN cell transmits a single TA just like an R15 terrestrial network (TN).

At time t1, VTA1 is served by TAI=X, VTA2 is served by TAI=Y, and VTA3 is served by TAI=Z. At time t2, TAI=X has completely moved out of VTA1. VTA1 is now served by TAI=Y, VTA2 is served by TAI=Z, and VTA3 is served by TAI=A. Hence, in the time window from t1 to t2, VTA1 is served by one of the two TAs, TAI=X and TAI=Y. A given location in a VTA is served by at least one of the TAs in the TA set associated with the VTA. For example, at time tN, which is inside the time window from time t1 to time t2, an NTN UE in the left half of VTA1 is in the coverage area of TAI=X, and an NTN UE in the right half of VTA1 is in the coverage area of TAI=Y. The access and mobility management function (AMF) can create an RA that includes TAI=X and TAI=Y, which would be valid during the time window t1 to t2.

TABLE 1 illustrates an example of the mapping between VTA and TA, which is conveyed to both the UE and the AMF.

TABLE 1

Mapping between VTA and TA

| Time Window | VTA # | TA Set (=VRA) | VTA # | TA Set (=VRA) | VTA # | TA Set (=VRA) | And so on . . . |
|---|---|---|---|---|---|---|---|
| t1 to t2 | 1 | X, Y | 2 | Y, Z | 3 | Z, A | . |
| t2 to t3 | 1 | Y, Z | 2 | Z, A | 3 | A, B | . |
| t3 to t4 | 1 | Z, A | 2 | A, B | | B, C | . |
| And so on . . . | . | . | . | . | . | . | . |

TABLE 2

VRA-VTA mapping

TABLE 2 shows example VRA-VTA mapping for multiple VTAs per VRA.

| VRA # | VTA # |
|---|---|
| VRA1 | VTA1 and VTA2 |
| VRA2 | VTA2 and VTA3 |
| VRA3 | VTA3 and VTA4 |

Depending on the implementation, TABLE 1 and TABLE 2 can be conveyed in one file or separate files and at the same time or at different times.

Consider a stationary UE in VTA1. It may be assumed that that the AMF has registered the UE in VRA1 that includes VTA1 and VTA2. At time tN between t1 and t2, the UE in VTA1 would detect TAI=X or Y. Since the table above indicates that VRA1 (equivalently, VTA1 and VT2) includes TAI=X and TAI=Y (and TAI=Z) at time tN, the UE does not perform mobility registration update. Now, consider time tM between t2 and t3. VTA 1 is now served by TAI=Y or TAI=Z. Hence, when the UE in VTA1 obtains TAI from a system information block (SIB) (such as SIB1), the UE would detect TAI=Y or Z. Since VRA1 related TA Set includes TAI=Y and TAI=Z (and TAI=A) at time tM, the UE does not perform mobility registration update. Hence, the concept of VTA/VRA eliminates unnecessary mobility registration updates when TAs are moving on the ground.

Figure 5:
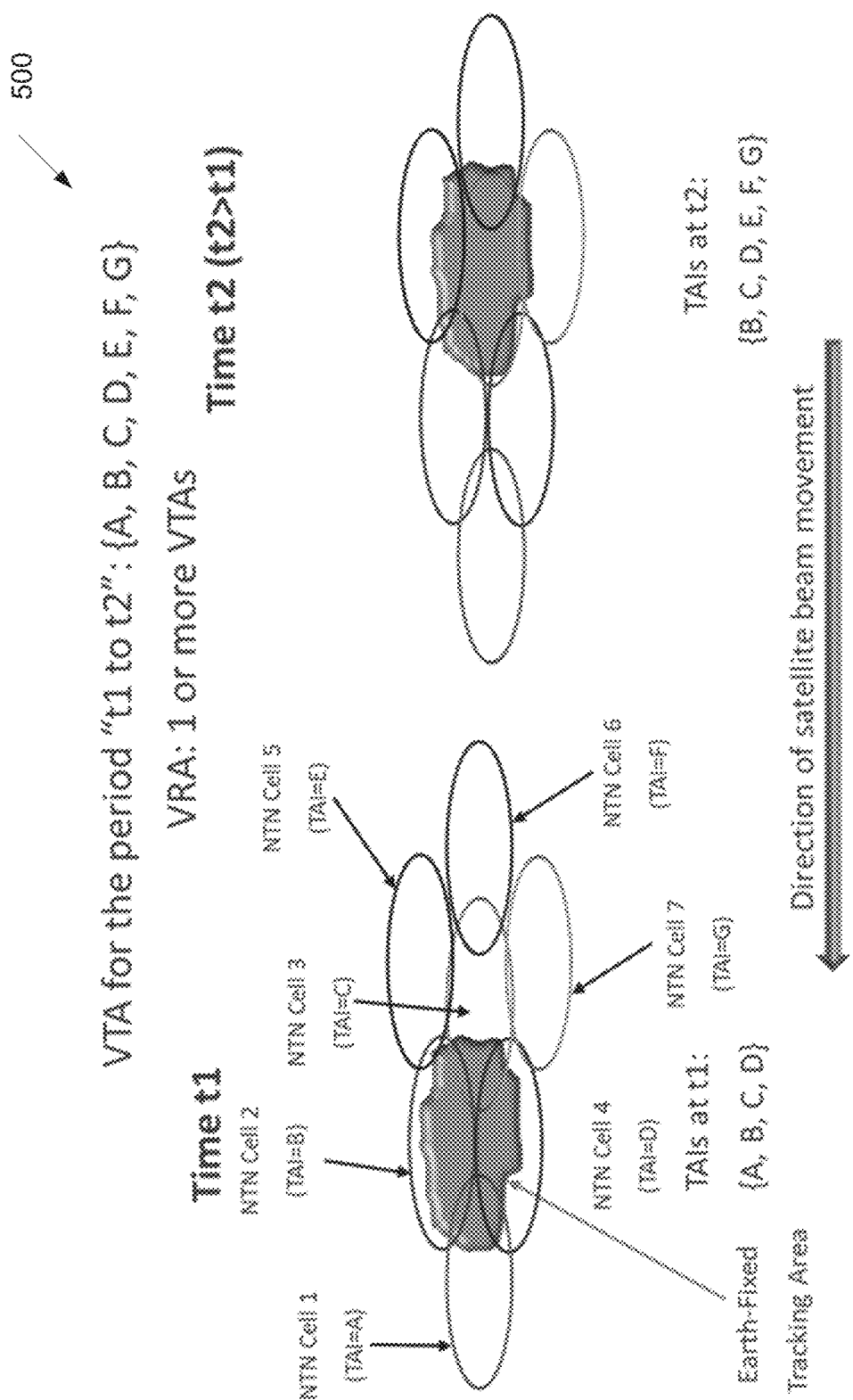
FIG. 5 illustrates an example tracking area identity (TAI), virtual tracking area (VTA), and virtual registration area (VRA) according to embodiments of the present disclosure.

FIG. 5 illustrates an example tracking area identity (TAI), virtual tracking area (VTA), and virtual registration area (VRA) 500 according to embodiments of the present disclosure. An embodiment of the TAI, the VTA, and the VRA 500 shown in FIG. 5 is for illustration only. One or more of the components illustrated in FIG. 5 can be implemented in specialized circuitry configured to perform the noted functions or one or more of the components can be implemented by one or more processors executing instructions to perform the noted functions.

Figure 6:
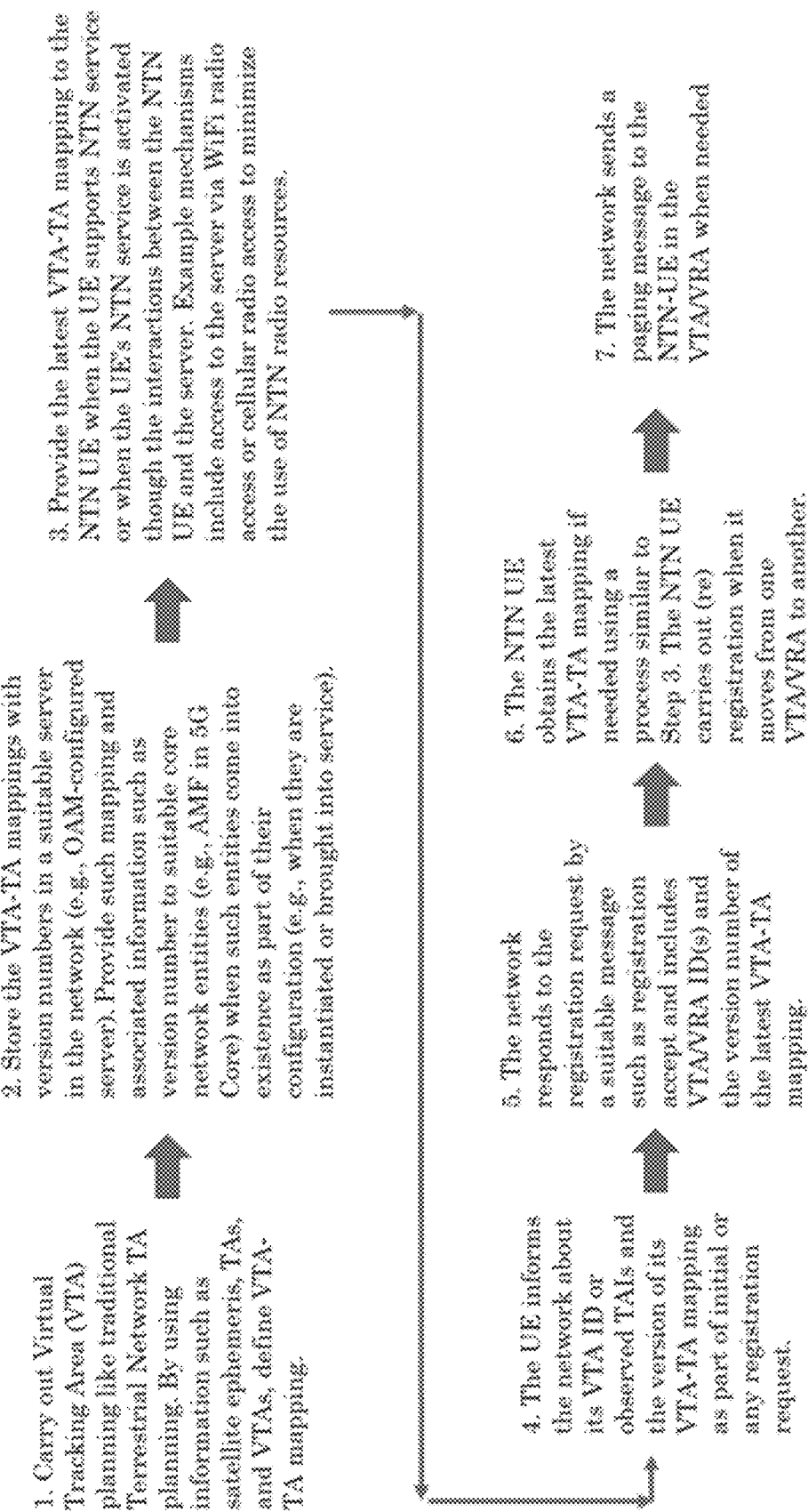
FIG. 6 illustrates an example overall steps of realizing and using VTAs according to embodiments of the present disclosure.

FIG. 6 illustrates an example of overall steps of realizing and using VTAs 600 according to embodiments of the present disclosure. An embodiment of the overall steps of realizing and using VTAs 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions.

As illustrated in FIG. 6, a human or a planning tool, or the combination of a human and a tool can create VTA-TA mapping and specify such mapping in an entity such as OAM or a server.

When the AMF needs to send a page message, the AMF sends the page message in the VRA. For example, if the AMF needs to send a page message to the NTN UE at time tN when the NTN UE is registered in VRA1, the AMF sends a page message in TAI=X, TAI=Y, and TAI=Z if VRA1 for the UE is defined to be VTA1 and VTA2 by the AMF. In 4G, the AMF-equivalent entity is mobility management entity (MME).

The present disclosure allows transmission of the same SIB (e.g., SIB1) in a given NTN cell regardless of the geographic area the NTN is serving. A single TAI is adequate for a given cell like R15. Hence, as the satellite goes from one geographic area to the next, no changes related to TAs are needed. The satellite can keep transmitting the same TAI-related SIB1 content in a given cell (identified by PCI and global cell identifier (ID)) all the time.

Figure 7:
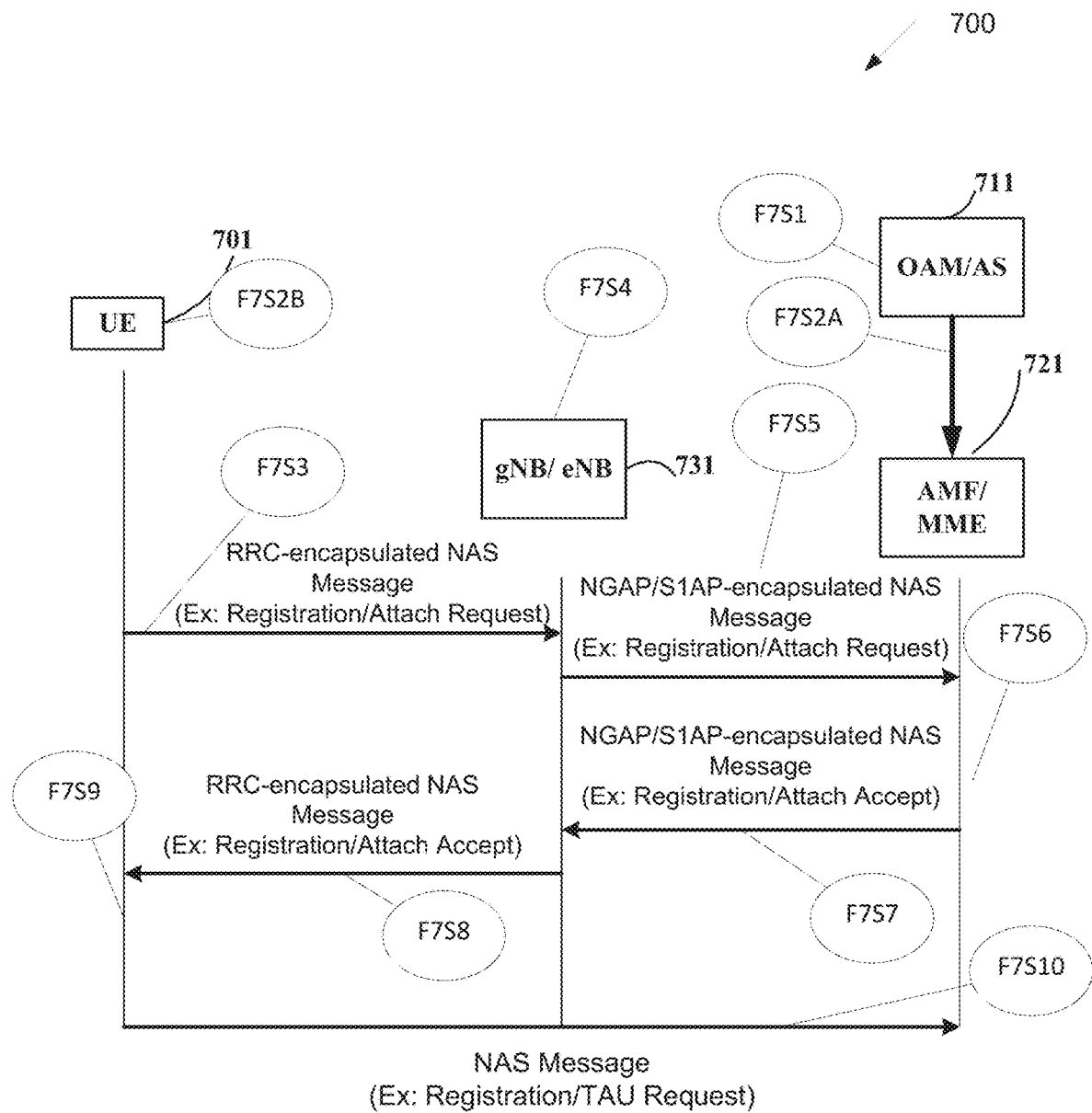
FIG. 7 illustrates an example 5$^{th}$ generation (5G) registration and long-term evaluation (LTE) attach according to embodiments of the present disclosure.

FIG. 7 illustrates an example $5^{th}$ generation (5G) registration and long-term evaluation (LTE) attach 700 according to embodiments of the present disclosure. An embodiment of the 5G registration and LTE attach 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

FIG. 7 illustrates a detailed background for the present disclosure by summarizing selected steps of the process of registration in case of 5G and Attach in case of LTE.

As illustrated in FIG. 7, at step F7S1, a suitable network entity such as operations, administration, and maintenance (OAM) or an application server (AS) (block 711) defines tracking areas associated with geographical areas. For example, a given city may be associated with a tracking area (TA) and such TA may be designated by a specific tracking area identifier (TAI). The TAI includes 3 octets (i.e., bytes) public land mobile network (PLMN) ID and tracking area code (TAC). The TAC is specified using 2 octets in LTE and 3 octets in 5G. Such mapping is conveyed to the AMF/MME (Block 821) in step F7S2A. The exact entities that actually define TAIs in geographic areas are implementation-dependent.

In Step F7S2B, the UE may obtain the initial VTA-TA mapping via a TN or an NTN using licensed, unlicensed, or shared spectrum. The UE may be configured with VTA-TA mapping implicitly or explicitly by the service provider as part of new device activation or new service activation, or software upgrade (which could be an over-the-air or OTA update).

In one embodiment, the NTN-operator-specific VTA-TA mapping table is conveyed to the UE and the AMF under the guidance of operations, administration, and maintenance (OAM) in Steps F7S2A and F7S2B. The VTA/VRA ID may have a structure similar to TAI or a new flexible and/or compact structure.

In one embodiment, the AMF can learn from OAM/Application Server (AS) about a new VTA-TA mapping in a manner similar to Step F7S2A. The AMF can still send the page message in the correct set of TAs (i.e., VRA) because the AMF knows the UE location based on the previous VTA-TA mapping. In such case, in any future registration accept message (e.g., due to periodic registration), the AMF can set the "newVTAMappingNeeded" bit or the mapping version number to inform the UE that the UE needs to obtain the latest VTA-TA mapping (e.g., from an OAM-controlled server).

In one embodiment, in step F7S2B, an initial VTA-TA mapping can be provided to the UE during the NTN service activation preferably via a non-NTN radio interface (e.g., cellular or WiFi access) to minimize the impact on the NTN air interface. An NTN air interface could also be used if desired. The VTA-TA mapping can be updated in future for the UE through via a non-NTN radio interface (e.g., cellular or WiFi access) or an NTN radio interface. The NTN UE can connect to an operator's server (which can be controlled by OAM) to obtain the VTA-TA mapping via non-NTN access to minimize the use of precious NTN radio resources on the service link and the feeder link.

In case of 5G, the OAM can provide the VTA-TA mapping to the AMF directly or indirectly when the AMF is brought into service (e.g., instantiated). The VTA-TA mapping is reasonably static and deterministic due to predictable movements of NTN platforms (e.g., satellites which is represented by "satellite ephemeris") and is typically determined as part of routine network planning and design. Of course, such mapping can be updated if needed due to re-planning or optimization of TAs or RAs.

In step F7S2B, if VTA-TA mapping is using the NR based air interface in an NTN, dedicated signaling and/or broadcast signaling using SIBs or multimedia broadcast multicast service (MBMS) could be utilized. In such case, the mapping could be conveyed in self-decodable and independent chunks of the file.

Common (e.g., system information or SI signaling) or dedicated signaling may indicate the version number of the VTA-TA mapping file, which can be used by the UE to obtain the new file if needed. In one embodiment, in case dedicated signaling is used to convey the VTA-TA mapping file to the UE, NAS signaling messages such as registration accept (5G), attach accept (LTE), TAU accept (LTE), downlink NAS transport (LTE), and DL NAS transport (5G) messages can be used.

When needed (e.g., after power-up), in step F7S3, the UE (block 701 as illustrated in FIG. 7) sends an RRC message that encapsulates a NAS message to get registered with the core network. In an LTE network, the UE may encapsulate the NAS Attach request message in the RRC connection setup complete message. In a 5G network, the UE may encapsulate the NAS registration request in the RRC Setup Complete message. The NAS message, attach request or registration request, contains the last visited registered TAI if available.

In one embodiment, in step F7S3, a UE may report a set of TAIs observed over a configurable time period along with suitable time stamps to facilitate identification of VTA/VTAs where the AMF can consider the UE registered.

In one embodiment, in step F7S3, the UE provides the most recent measurements of the serving cell and up to N neighboring cells in an RRC message that accompanies the NAS registration request message. The gNB/eNB uses these measurements reported by the UE and provides NR/LTE global cell IDs of suitable cells (e.g., M cells within X dB of the serving cell) to the AMF/MME. The AMF/MME can identify TACs/TAIs associated with the serving cell and M global cell identities to create a more compact registration area for the UE.

The LTE eNB/5G gNB (block 721) processes the received RRC message in step F7S4. Since this message contains a NAS message, the gNB/eNB forwards the NAS message to the AMF/MME in step F7S5 using an next generation application protocol (NGAP)/S1 application protocol (S1AP) message such as INITIAL UE MESSAGE. This NGAP/S1AP message includes the TAI and the cell identity where the RRC message from the UE has been received. The cell identity is extended cell global identifier (ECGI) for LTE and NR cell global identifier (CGI) for 5G. The NGAP INITIAL UE MESSAGE also includes the timestamp (UTC or universal coordinated time) as part of "user location info" field.

The AMF may be informed about the TAI of the UE's current cell or VTA as part of NGAP signaling (e.g., initial UE message) in step F7S5 to support the registration for the UE. In case of VTA, the gNB/eNB would need to be informed about the VTA-TA mappings.

The AMF/MME, in step F7S6, determines the geographic area where the UE would be considered registered. Such geographic area is called registration area in 5G and is represented by a TAI list in 5G and 4G.

In step F7S7, the AMF/MME sends NGAP/S1AP message (e.g., INITIAL CONTEXT SETUP REQUEST or DOWNLINK NAS TRANSPORT) containing the NAS registration accept/Attach accept message to the gNB/eNB.

In one embodiment, the AMF/MME can convey the need for new VTA-TA mapping to the UE in step F7S7 (registration accept/Attach accept or even TAU accept). More specifically, one way for the AMF to inform the NTN UE if the NTN UE needs to obtain new VTA-TA mapping is to by using a 1-bit field (newVTAMappingNeeded; "1": New mapping needed to be obtained by the UE and "0": New mapping not needed) in the NAS registration accept message. Another way is for the AMF to specify the version number of the VTA-TA mapping. The UE can compare an own version number with the one received from the AMF (or the MME) to determine the need to obtain a newer mapping. In general, changes in the VTA-TA mappings are expected to be relatively rare, because such mapping is typically determined as part of routine network planning and design.

In one embodiment, the information about registration area (RA) for a UE is represented in a compact manner to reduce the overall size of AS and NAS signaling messages. In registration accept message in step F7S7, the information that is common across multiple TACs/TAIs of the RA can be separately specified to achieve such signaling efficiency. Examples of such information includes PLMN ID, a certain number of most significant bits (MSBs) of a TAC, a timestamp that is the starting point for a time-based RA management for earth-moving TAIs, and the unit of time (e.g., minutes or seconds) and the incremental time value to convey incremental times of a time window beyond the initial starting point (e.g., 70 seconds per time window).

A set of earth-moving TAIs associated with a given earth-fixed tracking area is then specified using counters. For example, if the absolute time stamp is 10:00:00 (HH:MM:SS) and the time unit is seconds, and the incremental time value is 70 (=70 seconds of the time window), the first entry of the RA can be specified as {counter=0, L least significant bits of TACs A, B, and C}, and the second entry of the RA can be specified as {counter=1, L least significant bits of TACs C, D, and E}. The UE considers itself to be registered in (i) TAIs A, B, and C during the time interval 10:00:00 to 10:01:10 and (ii) in TAIs C, D, and E during the time interval 10:01:10 to 10:02:20. The overall time period can be configurable and can be set to the value of the periodic registration update timer (e.g., T3512 in 5G). The compact representation of TAIs and timestamps described here can also be utilized in the VTA-TA mapping table or file.

In one embodiment, the network may indicate the use of VTAs via broadcast signaling such as system information signaling (e.g., a parameter such as "VirtualTrackingAreaIn Use" in SIB1) or dedicated signaling (e.g., in registration accept message) in step F7S7. The support for VTA may be mandatory or optional. The UE may indicate the support for VTAs in the traditional UE network capability signaling mechanism. The AMF can then convey VRA ID and/or VTA ID in registration accept message.

In one embodiment, where a separate file is not used to specify VTA-TA mapping, the VRA can be specified as a set of TAIs instead of a set of distinct VTA values. In such embodiment, only a subset of the VTA/VRA-TA mappings applicable to the UE's current geographical area is specified as a function of near-term upcoming time windows in registration accept message in step F7S7. In a further enhancement, such TAIs and time windows can be represented in a compact manner to reduce the signaling overhead.

The gNB/eNB encapsulates the NAS registration accept/attach accept message in an RRC message (e.g., RRC reconfiguration in 5G and RRC connection reconfiguration in LTE) in step F7S8.

The UE in step F7S9 stores the TAI list to decide when to carry out a mobility registration update. For example, if the UE detects that the UE has entered a TA that is not in the TAI list, the UE initiates the mobility related registration update by sending a message such as registration request in 5G and tracking area update request in LTE in step F7S10.

For steps F7S3, F7S4, and F7S6, in one of the embodiments, the UE location along with the timestamp is conveyed to the AMF/MME by the gNB/eNB and/or the UE. For example, the UE itself may be global navigation satellite system (GNSS)-capable and may provide the UE's location coordinates such as (latitude, longitude) to the gNB and/or the AMF in step F7S3. In LTE, a message such as TAU request may also be used. In another implementation, the network (e.g., the gNB) in step F7S4 may determine an approximate UE location by using UE-reported measurements and/or network-made measurements or their combination.

The estimated location along with the timestamp and known coverage areas of satellite beams (e.g., based on satellite ephemeris) can be used by the AMF in step F7S6 to determine a VTA or a narrow set of VTAs so that the VRA covers fewer VTAs and hence fewer TAIs for actual paging. The AMF/MME can use the VTA-TA mapping to create a table that associates a TAI with all possible VTAs for a given time window. Example formats for the timestamp include UTC (universal coordinated time) and local time (with possible adjustments for time zones and daylight savings). Common timings may also be defined for the UEs without GNSS capabilities. The UE can provide "locationAssistanceInfoFromUEForRegistration" in registration request to the core network. The field "locationAssistanceInfoFromUEForRegistration" includes elements such as the timestamp in the UTC or another format and the UE's location (e.g., (latitude, longitude) if available).

If available, the gNB/eNB may also provide to the AMF/MME the estimate of the UE's GNSS-based location using the UE's knowledge of the NTN cell's coverage, processing of downlink measurements reported by the UE (e.g., reference signal received power (RSRP)), and/or processing of the uplink measurements (e.g., uplink timing advance) in "locationAssistanceInfoFromgNBForRegistration" using NGAP. The core network (e.g., AMF or the MME) can use the UE location obtained from the UE and/or the gNB/eNB along with the timestamp to determine the registration area for the UE.

For steps F7S3 and F7S7, in one embodiment, steps F7S3 and F7S7 are enhanced by modifying registration/Attach request and registration/attach accept messages. For example, the UE sends to the network a registration request message containing one or more of the followings: the TAI ID (VTA ID can be similar to TAI in an R15 TN message), VTA-TA mapping version (which can be only few bits such as 2 to 4 bits because frequent changes in TAs are rare) and time stamp. This message can be used to perform initial registration as well as to perform mobility-based registration update when the UE detects a TAI that is not part of the applicable TA Set associated with the current VTA. The AMF, in response, simply sends R15-like registration accept. No new fields are needed in registration accept to support the request in one embodiment of the invention.

The AMF can simply convey the VRA as the TAI list, where the TAI list includes VTAs. Note that only one VRA (equivalent to the TAI list including VTA IDs) is adequate in an NTN, because the UE and the AMF implicitly use the VRA including multiple TAs according to the VTA-TA mapping. Hence, simplified mapping further increases NAS and signaling radio bearer (SRB) signaling efficiency. The LTE messages equivalent to 5G registration request are Attach request and tracking area update request. The LTE messages equivalent to 5G registration accept are attach accept and tracking area update accept.

In one embodiment, when an NTN cell transmits a set of multiple TAIs to cover a given earth-fixed tracking area and dynamically changes such set at one instant in a geographic area to another instant in a different geographic area, a compact representation of TAIs in a SIB would be beneficial. Since a SIB may need to be changed quickly (e.g., on the order of few hundred milliseconds) based on the specific geographic area being covered by a satellite beam, faster processing of a SIB can be facilitated by representing the TAIs in a compact format (e.g., separating common PLMN ID and most significant bits from varying specific least significant bits). A new compact SIB that only includes TAIs can also significantly reduce the processing time at the UE to detect TAI changes quickly and reliably.

In one embodiment, the UE does not carry out the TA change-based TA updates until the UE receives the VTA-TA mapping per network configuration. In another embodiment, this can be specified as the default UE procedure without any explicit network configuration.

In an LTE network, after the attach procedure has been carried out, the tracking area update (TAU) occurs using the NAS messages tracking area update request and tracking area update accept, which replace the NAS messages attach request and Attach accept, respectively, as illustrated in FIG. 7.

Figure 8:
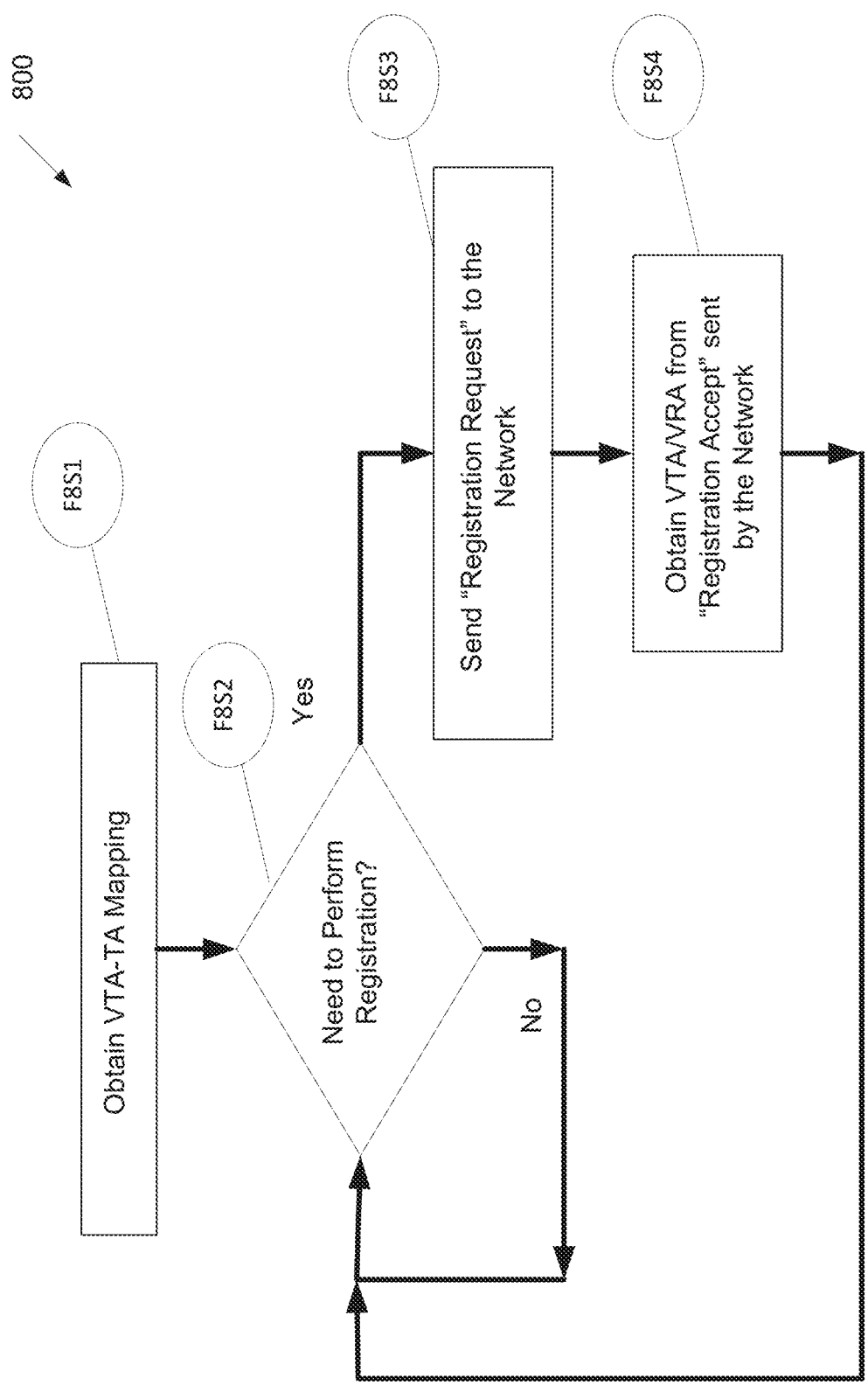
FIG. 8 illustrates an example user equipment (UE) behavior for 5G registration according to embodiments of the present disclosure.

FIG. 8 illustrates an example user equipment (UE) behavior for 5G registration 800 according to embodiments of the present disclosure. An embodiment of the UE behavior for 5G registration 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

As illustrated in FIG. 8, in step F8S1, the NTN-capable UE obtains the VTA-TA mapping in one of the several ways mentioned earlier (e.g., via a non-NTN access or an NTN access).

In step F8S2, the UE checks on a continuous basis if the UE needs to do registration. Example scenarios include initial registration (e.g., after power up), periodic registration (e.g., at the expiry of a timer), and mobility-based registration (e.g., when the new serving cell is associated with a TAI that is not in the valid VRA previously obtained from the network).

If the UE determines that the registration needs to be performed, in step F8S3, the UE sends a NAS registration request message with supporting information such as a GNSS-based location. The gNB forwards the UE's NAS message to the AMF and includes relevant information such as the cell ID and TAI in an NGAP message carrying the UE's NAS message.

In step F8S4, the UE receives the VRA (e.g., VRA ID or a set of VTAs associated with the correct VRA) in the NAS "registration accept" message.

To support mobility-based registration, the UE evaluates the need for registration in step F8S2 after the UE has obtained the VRA from the network as part of initial registration and whenever the UE crosses into a new serving cell. For example, when the UE enters a new cell, the UE observes system information to see if the TAI(s) of the new cell is/are part of the VRA or not. If the new TAI is not part of the VRA (in the relevant time window, if applicable), the UE initiates the mobility-based registration by sending a NAS "registration request" message.

The present disclosure exploits the knowledge of the direction of the satellite movement based on satellite ephemeris to create a compact and practical neighbor list. The compact and practical neighbor list created by this disclosure reduces the probability of handover or cell reselection to an incorrect cell. The present disclosure also simplifies the NTN UE's search of neighboring NTN cells and increases the access stratum signaling efficiency when non-GEO satellites have moving-earth beams (i.e., the beams that move with the satellite). The present disclosure can reduce the size of such neighbor list significantly (e.g., by 33%). The present disclosure reduces the size of a system information (SI) message related to neighboring cells.

Furthermore, the shortened neighbor list created by the disclosure enables the UE to detect neighboring cells more quickly and to detect more suitable neighboring cells for cell reselection or handover. The present disclosure avoids the search of unnecessary neighboring cells for which the UE would not be able to do successful cell reselection or handover in practice, increasing the processing power efficiency and resource utilization efficiency at the network and the UE. This disclosure can also be used in conjunction with the automatic neighbor relation (ANR) feature to prune or fine-tune the terrestrial network-like neighbor list. The present disclosure is applicable to non-GEO satellites that are using moving-earth beams (i.e., the beams that move with the satellite).

An NTN UE, like a UE in a TN, performs cell reselection in RRC_INACTIVE and RRC_IDLE state and handover in RRC_CONNECTED state. The UE needs to search for neighboring cells to identify the cell for cell reselection and to report suitable cell(s) to facilitate handover. In case of an NTN that employs non-GEO satellites with moving-earth beams, it is possible to shorten the neighbor list. A shortened neighbor list accelerates the process of cell search and avoids inadvertent selection of an incorrect cell for reporting as well as handover. Both common system information signaling and dedicated RRC signaling become more compact and hence more efficient due to this disclosure.

In an NTN, due to the long propagation delays and resulting slow reaction time of RRC signaling, the adverse impact of handover to an incorrect cell is magnified compared to a TN. For example, the communication interruption time can be much longer in case of a handover failure in an NTN compared to a TN. A gNB-DU on the satellite and a gNB-CU on the ground or a transparent payload on the satellite would have much longer RRC signaling delays compared to a TN.

Similarly, reselection to an incorrect cell may require more processing at the NTN UE to detect a more appropriate cell. Furthermore, processing power requirements and reliability assume higher importance in an NTN due to the more challenging propagation environment in an NTN resulting from large propagation path losses and long delays.

The present disclosure creates a neighbor list that is shorter than a typical neighbor list in an NTN by exploiting the direction of the satellite movement.

Figure 9:
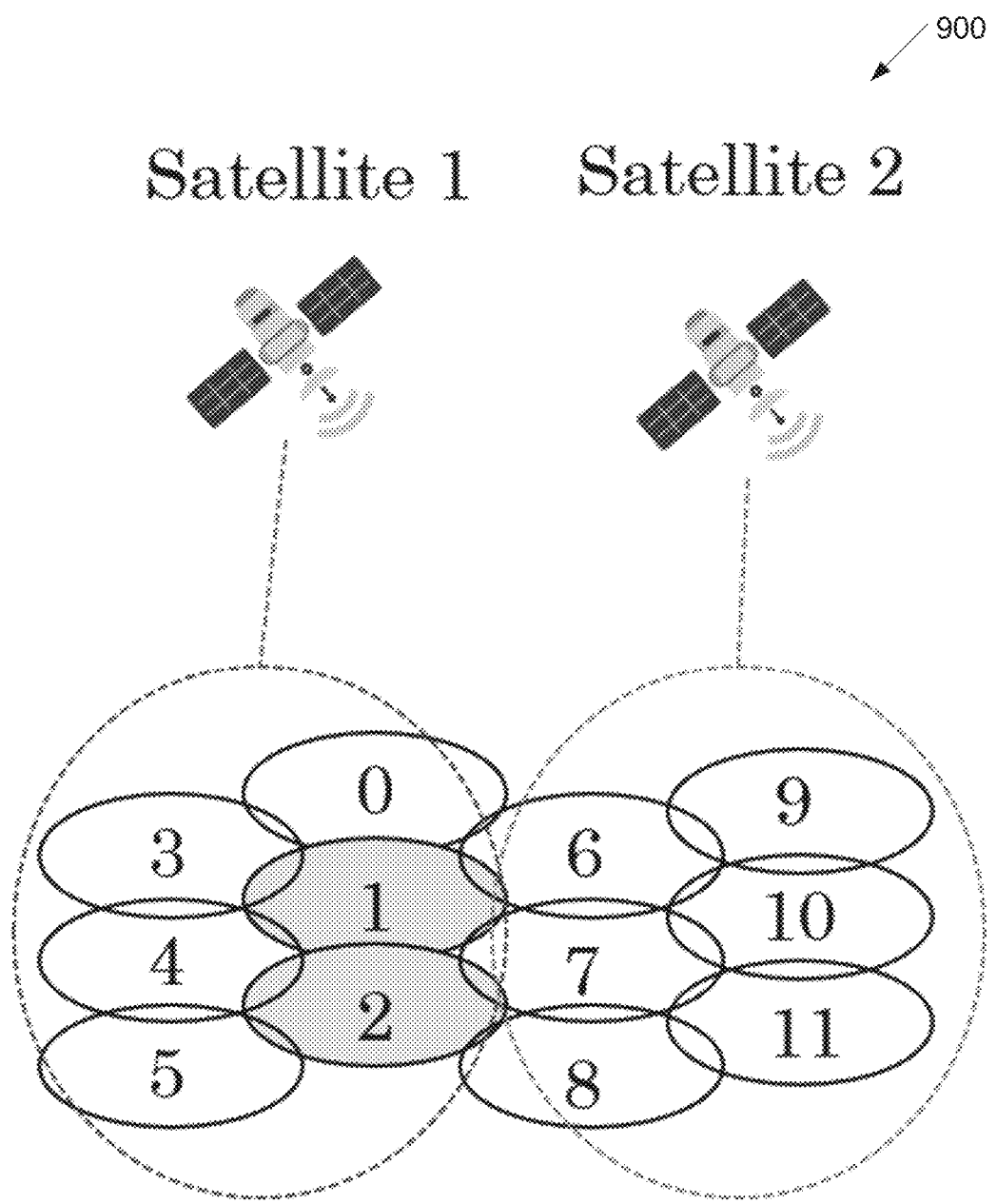
FIG. 9 illustrates an example terrestrial network according to embodiments of the present disclosure.

FIG. 9 illustrates an example terrestrial network 900 according to embodiments of the present disclosure. An embodiment of the terrestrial network 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, a non-GEO (e.g., LEO) satellite 1 is managing the PCIs 0 to 5, and another non-GEO (e.g., LEO) satellite 2 is managing the PCIs 6 to 11. The satellites and the satellite beams are continuously moving from right to left in FIG. 9. Note that the present disclosure is applicable to the deployment architectures where the satellite beams move on the earth as the satellites orbit around earth. Since the beams of both satellites move at the same time, the relative positions of these satellite beams and hence NTN cells remain the same as the satellites illuminate one geographic area at one instant and another geographic area at another instant.

As illustrated in FIG. 9, if an NTN UE is in cell 7, it is not practical for such NTN UE to perform cell reselection or handover to the cells to the left of cell 7. For example, in the absence of this disclosure, a typical neighbor list for cell 7 could be {1, 2, 6, 8, 10, 11}. However, this disclosure creates a shorter neighbor list by avoiding cells to the left of cell 7. Hence, this disclosure removes the cells {1, 2} from the original list to create a more compact neighbor list {6, 8, 10, 11}. In this example, the number of neighbors was reduced from 6 to 4, which is 33% reduction in the number of cells to be searched and processed.

Here are example calculations to show why "left cells" (e.g., cells 1 and 2 as illustrated in FIG. 9) are unnecessary and hence can be removed from the neighbor list. A LEO satellite moves at the speed of 7 km/s to 8 km/s, with a lower speed at a higher altitude. Consider an NTN UE located at the leftmost portion of cell 7. To cross into cell 1 (or cell 2) from the current cell 7, the NTN UE would have to exceed the speed of satellite. The fastest bullet train speed on the ground is less than 500 km/hr (which is also the maximum target speed being aimed by 5G) or about 0.14 km/s, which is much less than 7 km/s. Now, consider an NTN UE on the plane. The commercial planes move at the speed of less than 1000 km/hr, which is about 0.3 km/s. As these examples clearly indicate, an NTN UE can never move into a cell that is to the left of the current cell. The present disclosure makes use of this knowledge to create a shortened neighbor list. Such shortened neighbor list can be used in all RRC states of the UE.

Note that even if an NTN UE were to be in the overlap region of cell 2 and cell 7 (or cell 2 and cell 1) at a given instant, the NTN UE would be very quickly (within few milliseconds) move into a cell with better propagation characteristics due to the satellite movement.

Figure 10:
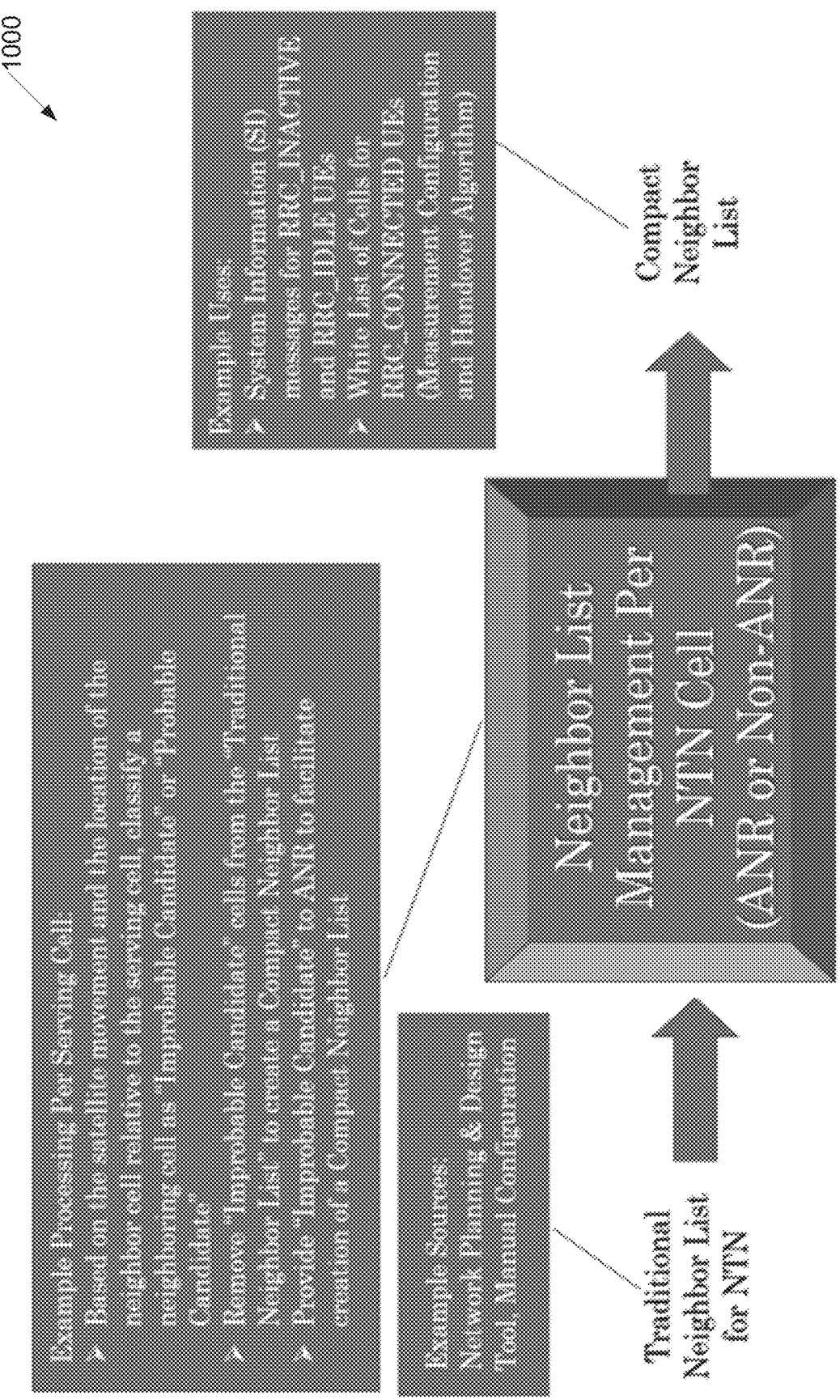
FIG. 10 illustrates an example mechanism of the creation of a compact neighbor list according to embodiments of the present disclosure.

FIG. 10 illustrates an example mechanism of the creation of a compact neighbor list 1000 according to embodiments of the present disclosure. An embodiment of the mechanism of the creation of a compact neighbor list 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

Figure 11:
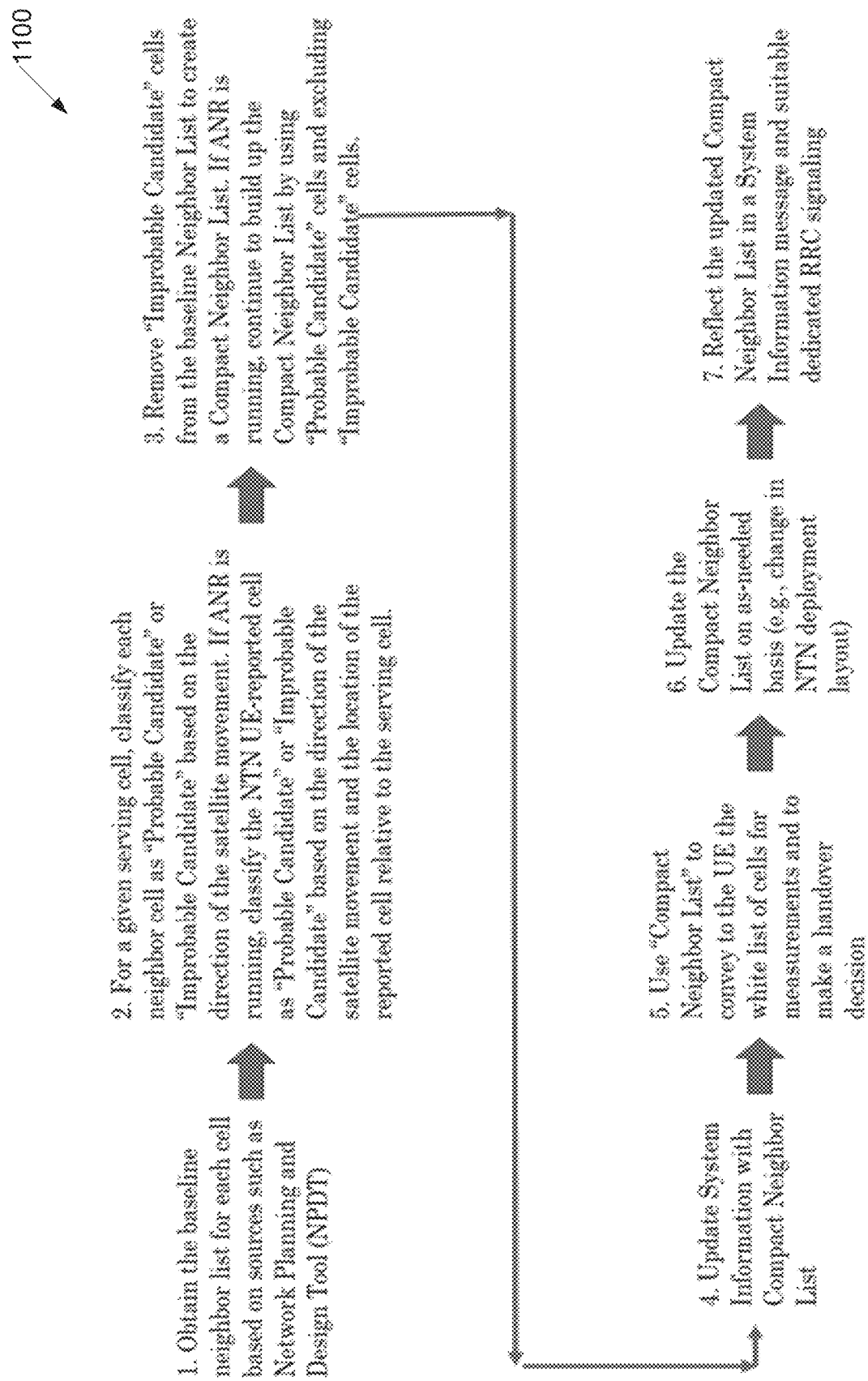
FIG. 11 illustrates an example overall steps of the creation of a compact neighbor list according to embodiments of the present disclosure.

FIG. 11 illustrates an example overall steps of the creation of a compact neighbor list 1100 according to embodiments of the present disclosure. An embodiment of the overall steps of the creation of a compact neighbor list 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

In one embodiment, an SI message and/or a dedicated RRC signaling message could set a field such as "PowerEfficientGuidedCellSearch" to 1 to inform UEs to search for explicitly specified neighbors only (which are in compact neighbor list) to save processing power and to accelerate correct cell detection and 0 to inform UEs that no such search guidance is provided (implying that autonomous detection of cells is allowed). In one embodiment, the network could make use of the minimization of drive test (MDT) feature to get a more comprehensive neighbor list from NTN UEs to create an enhanced neighbor list as the new baseline neighbor list (e.g., as part of step 6 in FIG. 11).

One embodiment of this disclosure can be used to prune or fine-tune the neighbor list being created by 5G ANR. In the architecture scenarios C2 and D2 (i.e., non-GEO moving beams), each cell can be conveyed the first tier (or first two tiers based on the deployment scenario) of "left cells" that are "improbable candidates." In one possible implementation approach, operations, administration, and maintenance (OAM) can provide such list to a given cell based on the outcome of the NTN network planning and design efforts.

The present disclosure provides enhanced handover and cell reselection. Since the cost of an incorrect handover is much higher in an NTN compared to the TN due to long propagation delays, a compact neighbor list is helpful to the overall solution for efficient and seamless handover. The present disclosure also increases efficiency of common signaling (i.e., system information) and dedicated signaling (i.e., dedicated RRC signaling) while providing an appropriate neighbor list in an NTN. When an SI message is sent using a predetermined amount of radio resources, a compact neighbor list implies that more redundancy bits or code symbols can be transmitted, enhancing the reliability of SI detection.

Figure 12:
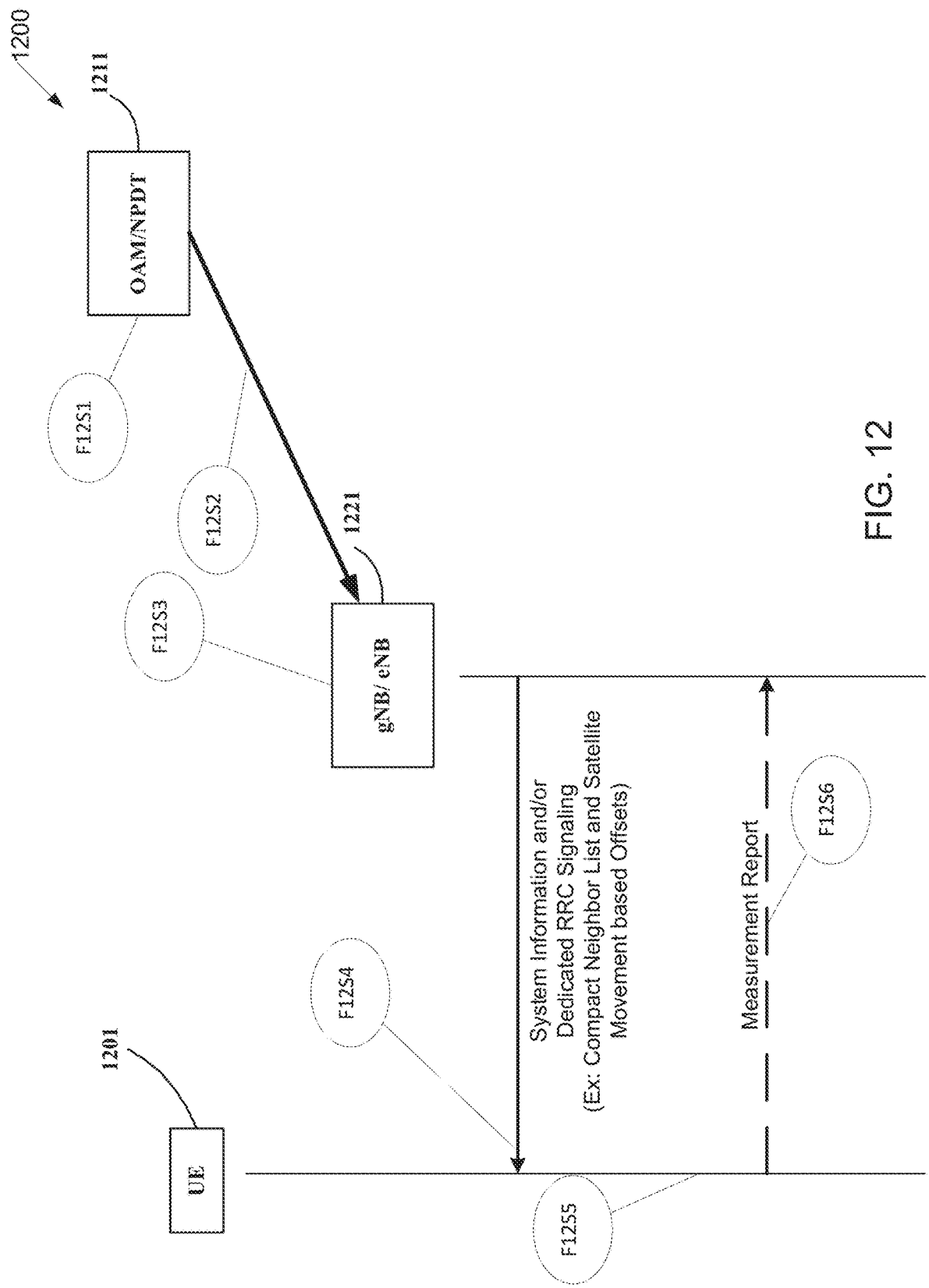
FIG. 12 illustrates an example UE-network interaction for a compact neighbor list according to embodiments of the present disclosure.

FIG. 12 illustrates an example UE-network interaction for a compact neighbor list 1200 according to embodiments of the present disclosure. An embodiment of the UE-network interaction for a compact neighbor list 1200 shown in FIG. 12 is for illustration only. One or more of the components illustrated in FIG. 12 can be implemented in specialized circuitry configured to perform the noted functions or one or more of the components can be implemented by one or more processors executing instructions to perform the noted functions.

FIG. 12 shows interactions between the device and the network.

As illustrated in FIG. 12, In step F12S1, in an example approach, a network entity 1211 such as operations, administration, and maintenance (OAM) or network planning and design tool (NPDT) determines an NTN neighbor list for a given cell.

In another embodiment, a network entity in step Fl2S1 may determine a compact NTN neighbor list, which reflects the satellite/cell movement.

In step F12S2, a network entity provides a regular NTN neighbor list (without considering the satellite movement) or a compact NTN neighbor list (after considering the satellite movement) to the eNB/gNB 1221.

In step F12S3, the eNB/gNB creates a shorter neighbor list after receiving a regular neighbor list or reuses or modifies a compact neighbor list received from another network entity 1211.

The eNB/gNB, in step F12S4, conveys the compact list (that reflects the satellite/cell movement) to the UE 1201 through common system information (SI) signaling and/or dedicated signaling.

In one embodiment, an SI message and/or a dedicated RRC signaling message in step F12S4 could set a field such as "PowerEfficientGuidedCellSearch" to 1 to inform the UEs that it is adequate for the UE to search for the cells explicitly specified in compact neighbor list. In another implementation, the network may make it mandatory for the UE to measure (and report when appropriate based on configured events) only the specified cells.

In another embodiment, an SI message and/or a dedicated RRC signaling message in step F12S4 may include satellite movement-based offsets. These offsets can be exploited to detect a suitable cell earlier and/or to encourage or discourage cell reselection and handover toward a given neighbor cell based on the satellite/cell movement. The movement-based offset (which can be zero, positive, or negative) provides flexibility of differentiating the cells based on the movement of NTN cells.

In another implementation, offsets (zero, positive, or negative values) can be conveyed to the UE in step F12S4 based on the NTN Type (e.g., LEO vs. GEO) to prioritize selection of a certain type of the NTN.

In another implementation, offsets (zero, positive, or negative values) or other suitable parameters can be conveyed to the UE in step F12S4 to facilitate selection of an NTN cell based on the service type and device type (e.g., IoT vs. non-IoT).

In another implementation, offsets (zero, positive, or negative values) or other suitable parameters can be conveyed to the UE in step F12S4 to facilitate selection of a specific cell such as a TN cell or an NTN cell of a specific type when the same or different carrier frequencies are used by a TN and an NTN.

In step F12S5, the UE makes a note of the received compact neighbor list and uses the list to perform neighbor cell search.

When needed (e.g., when a measurement event occurs), the UE in the RRC_CONNECTED mode sends a measurement report message to the eNB/gNB in step F12S6.

Figure 13:
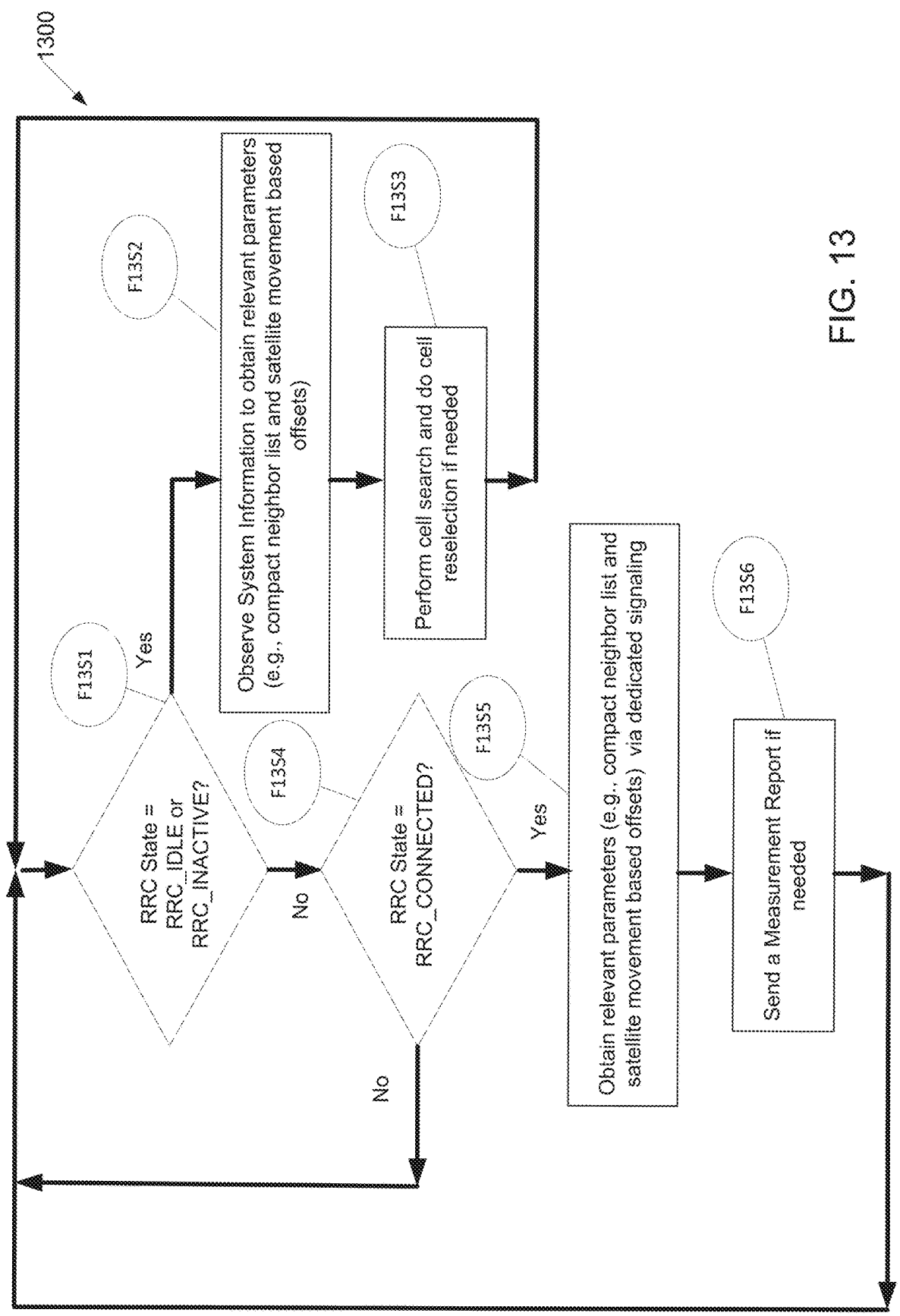
FIG. 13 illustrates an example UE behavior for the satellite movement based compact neighbor list according to embodiments of the present disclosure.

FIG. 13 illustrates an example UE behavior for the satellite movement based compact neighbor list 1300 according to embodiments of the present disclosure. An embodiment of the UE behavior for the satellite movement based compact neighbor list 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

FIG. 13 illustrates UE behavior to make use of the knowledge of the satellite movement. In particular, cell reselection aspects of the UE procedures are discussed below. In a wireless network (e.g., LTE and 5G network), the device in the idle or inactive mode periodically searches for the best cell to monitor or camp on so that the UE can reliably receive any downlink message from the network or carry out the random access procedure in the best cell. The UE makes measurements of the currently serving cell and suitable neighboring cells and compares these cells using formulas such as equations 1, 2, and 3 as shown in below. In general, a cell reselection to a neighboring cell occurs if such cell is better than the currently serving cell.

As illustrated in FIG. 13, in step F13S1, the UE checks if an RRC state is RRC_IDLE or RRC_INACTIVE. If yes, the UE in step F13S2 observes the parameters obtained from system information signaling (unless the UE-specific parameters have been previously provided to the UE via dedicated RRC signaling). The UE uses these parameters such as PowerEfficientGuidedCellSearch, compact intra-frequency neighbor list, compact inter-frequency neighbor list, and/or satellite movement-based offsets.

In one example, the network may specify a neighbor cell-specific offset Qntn-movement for the cell selection/reselection criterion as part of formulas such as the following in support of cell reselection to an intra-frequency neighbor cell, an inter-frequency neighbor cell, or an inter-RAT neighbor cells. Relative to the serving cell, the neighbor cell may belong to the same-priority frequency, a lower-priority frequency, or a higher-priority frequency.

In one example, intra-frequency and equal-priority inter-frequency cell reselection can use the neighbor cell ranking criterion similar to the one below (see 3GPP 38.304 for details of pre-existing parameters and variables).

$$R_n = Q_{meas,n} - Q_{offset} - Q_{offset-temp} - Q_{ntn-movement-n} \qquad \text{Equation 1}$$

In equation 1, $R_n$ is the rank of the neighbor cell n, $Q_{meas,n}$ is the measured quantity (e.g., RSRP) for the neighbor cell n, $Q_{offset-temp}$ is a temporary offset used when an RRC connection establishment fails in a cell (see 3GPP TS38.331), and $Q_{ntn-movement-n}$ is the new parameter introduced by an embodiment of this disclosure. $Q_{ntn-movement-n}$ can be zero, positive, or negative. A value of zero means that the reselection to this cell is neither encouraged nor discouraged. A positive value of $Q_{ntn-movement-n}$ means that reselection to this cell is discouraged, and a negative value of $Q_{ntn-movement-n}$ means that the reselection to this cell is encouraged.

In one example, cell reselection criteria toward a high-priority frequency for inter-frequency and inter-RAT cell reselection can be adjusted to reflect the influence of the NTN cell movement as shown in equations 2 and 3 as shown in below. See 3GPP 38.304 for details of pre-existing parameters and variables.

$$S_{qual} > (\text{Thresh}_{X,\ HighQ} + Q_{ntn-movement-n}) \qquad \text{Equation 2}$$

In equation 2, $S_{qual}$ is the measure of the quality of the neighbor cell n, $\text{Thresh}_{X,\ HighQ}$ is the threshold quality level for the high-priority frequency cell, and the new $Q_{ntn-movement-n}$ is parameter introduced by an embodiment of this disclosure.

$$S_{rxlev} > (\text{Thresh}_{X,\ HighP} + Q_{ntn-movement-n}) \qquad \text{Equation 3}$$

In equation 3, $S_{rxlev}$ is the measure of the receive signal strength level of the neighbor cell n, $Thresh_{X,\ HighP}$ is the threshold signal level for the high-priority frequency cell, and $Q_{ntn\text{-}movement\text{-}n}$ is the new parameter introduced by an embodiment of this disclosure.

In step F13S3, the UE carries out the neighbor cell search using a compact neighbor list obtained from the network and performs cell reselection if necessary after applying relevant offsets such as $Q_{ntn\text{-}movement\text{-}n}$. The UE goes back to Step F9S3 after performing cell reselection.

If the UE finds that the UE is not in RRC_IDLE or RRC_INACTIVE mode in step F13S1, the UE checks in step F13S4 if the UE is in RRC_CONNECTED mode (which would typically be the case under normal circumstances).

FIG. 13 illustrates the UE behavior for the satellite movement-based compact neighbor list.

The UE in RRC_CONNECTED mode obtains in step F13S5 the compact neighbor list and other parameters via dedicated RRC signaling (e.g., via messages such as RRC reconfiguration in NR and RRC connection reconfiguration in LTE).

If a neighboring cell from the compact neighbor list meets the measurement criterion of a configured event (e.g., event A3), the UE sends a measurement report to the network in step F13S6.

In one example, the neighbor cell related criterion can be adjusted to reflect the influence of the satellite/NTN cell mobility as shown in equation 4 below for the entering condition of event A3 (see 3GPP TS38.331 for details). Event A3 corresponds to the case where a neighboring cell es better than the currently serving cell by a certain amount. For example, for certain numerical values of the parameters in equation 4 below, the UE would send a measurement report to the network when RSRP of the neighboring cell is greater than RSRP of the serving cell by 3 dB. Similar changes can be made in other events where the neighbor cell measurement is considered.

$$Mn + Ofn + Ocn - Hys - Q_{ntn\text{-}movement\text{-}n} > Mp + Ofp + Ocp + Off \quad \text{Equation 4}$$

In equation 4, Mn is the measurement result of the neighboring cell n, Ofn is the measurement object specific offset of the reference signal of the neighbor cell n (i.e., offsetMO as defined within MeasObjectNR in NR), Ocn is the cell specific offset of the neighbor cell (i.e., cellIndividualOffset defined within measObjectNR), Mp is the measurement result of the SpCell, Ofp is the measurement object specific offset of the SpCell (i.e. offsetMO as defined within measObjectNR), Ocp is the cell specific offset of the SpCell (i.e. cellIndividualOffset as defined within measObjectNR), Hys is the hysteresis parameter for this event (i.e., hysteresis defined within reportConfigNR), Off is the offset parameter for this event (i.e., a3-Offset defined within reportConfigNR), and $Q_{ntn\text{-}movement\text{-}n}$ is the new parameter introduced by an embodiment of this disclosure.

When the compact neighbor list has completely avoided the non-probable handover candidate cells, this parameter can help differentiate between making a cell a neutral cell or a preferred cell. A neighbor cell can be made a preferred cell when an accelerated handover to such cell is desirable.

The present disclosure reconfigures suitable radio parameters via MAC signaling and PHY signaling instead of RRC signaling to accelerate the overall process of radio reconfiguration. There could be a significant difference in the processing delay between MAC signaling and RRC signaling depending upon the network deployment architecture.

Such earlier use of the new radio configuration helps achieve the target objective such as increased throughput or higher reliability. Since 5G phase 1 allows the resource allocation to change quite fast (e.g., as fast as every 0.125 ms), significant performance gain can be realized due to fast radio reconfiguration, optimizing the resource utilization, and enhancing the user experience.

There could be a significant difference in the processing delay between MAC signaling and RRC signaling depending upon the network deployment architecture. For example, when an NTN deploys gNB-DU on the satellite and gNB-CU on the ground, there could be as much as 60 ms delay between (i) the time a radio reconfiguration is desirable and (ii) the time such reconfiguration can take an effect when RRC signaling is used for radio reconfiguration.

In contrast, the delay could be only about 30 ms between (i) the time a radio reconfiguration is desirable and (ii) the time such reconfiguration can take an effect when MAC signaling is used for radio reconfiguration. Thus, MAC signaling can potentially reduce the delay by 50%, and a new radio configuration can potentially be made use of about 30 ms sooner.

There could be a significant difference in the processing delay between MAC signaling and RRC signaling depending upon the network deployment architecture. Radio reconfiguration, where various radio related parameters are modified, is typically done via RRC signaling. Such reliance of RRC signaling can result in sub-optimal use of precious radio resources. For example, when an NTN deploys gNB-DU on the satellite and gNB-CU on the ground, RRC reconfiguration can be significantly slower than MAC signaling and PHY signaling.

This may lead to a long-time window, on the order of tens of ms, during which sub-optimal radio configurations are used. In particular, since the 5G PHY layer is able to reallocate resources quite rapidly (e.g., within 1 ms), the use of sub-optimal radio configurations prevents realization of the full potential of 5G in NTNs.

Fast radio reconfiguration through MAC and PHY signaling adapts relevant parameters promptly so that precious radio resources are utilized in a suitable manner to achieve the target objective of higher throughput or reliability.

Example operations that can be quickly adapted via MAC signaling or PHY signaling are briefly discussed below.

In one example of PDSCH/PUSCH aggregation, 5G defines aggregation of physical downlink shared channel (PDSCH) and physical downlink shared channel (PUSCH), where data in a given transport block (TB) can be transmitted in multiple slots on the PDSCH and/or the PUSCH. The receiver combines these multiple transmissions to reliably detect the transmitted information. Such aggregation increases reliability at the expense of average cell throughput or capacity.

In Release 15, the number of slots over which the PDSCH/PUSCH is aggregated can be set to 2, 4, or 8. For a dynamic grant, pdsch-AggregationFactor and pusch-AggregationFactor specify the number of TB repetitions of PDSCH and PUSCH, respectively. For a configured uplink grant, the parameter repK specifies the number of transmissions of data of a Transport Block. If pdsch-AggregationFactor is set to 4, the same data is transmitted 4 times on the PDSCH in four slots.

A gNB uses an implementation-specific mechanism to determine pdsch-AggregationFactor and pusch-AggregationFactor. In one example, if the amount of available radio resources in the downlink/uplink per QoS flow is relatively high but the amount of traffic to be sent is relatively low, pdsch-AggregationFactor/pusch-AggregationFactor can be increased to enhance reliability for currently active QoS Flows. In contrast, if the amount of available radio resources in the downlink/uplink per QoS Flow is relatively low but the amount of traffic to be sent is relatively high, pdsch-AggregationFactor/pusch-AggregationFactor can be decreased to increase the average cell throughput to accommodate more traffic.

In one example of dynamic HARQ control, since an NTN inherently has long propagation delays, there are fewer opportunities for radio link control (RLC) retransmissions. Hence, fast hybrid automatic repeat request (HARQ) retransmissions at PHY/MAC layer become more important in an NTN to help achieve the target QoS. HARQ can be controlled more dynamically when MAC or PHY signaling is used.

In one example of HARQ enabling/disabling, the gNB can enable or disable HARQ quickly via MAC signaling instead of RRC signaling. Such disabling can eliminate the need for an explicit acknowledgment (ACK)/negative acknowledgment (NACK) feedback from the receiver while still supporting HARQ processes. In one example, the gNB can disable HARQ when the satellite with fixed-earth beams is about to go below horizon for a given NTN cell. This may avoid unnecessary processing related to the creation of a HARQ feedback, because such HARQ feedback cannot be sent to the currently serving NTN cell due to impending satellite movement-based handover.

In one example of HARQ acknowledgment delay, the gNB or the gNB-DU can use the knowledge of the NTN cell's coverage based on the satellite ephemeris to estimate the propagation delay for the earth-fixed beams of non-GEO satellites. Then, such delay estimate can be used to reconfigure the value of the parameter "PDSCH-to-HARQ_feedback timing indicator" in a DCI message (see TS38.212 and TS38.213).

Figure 14:
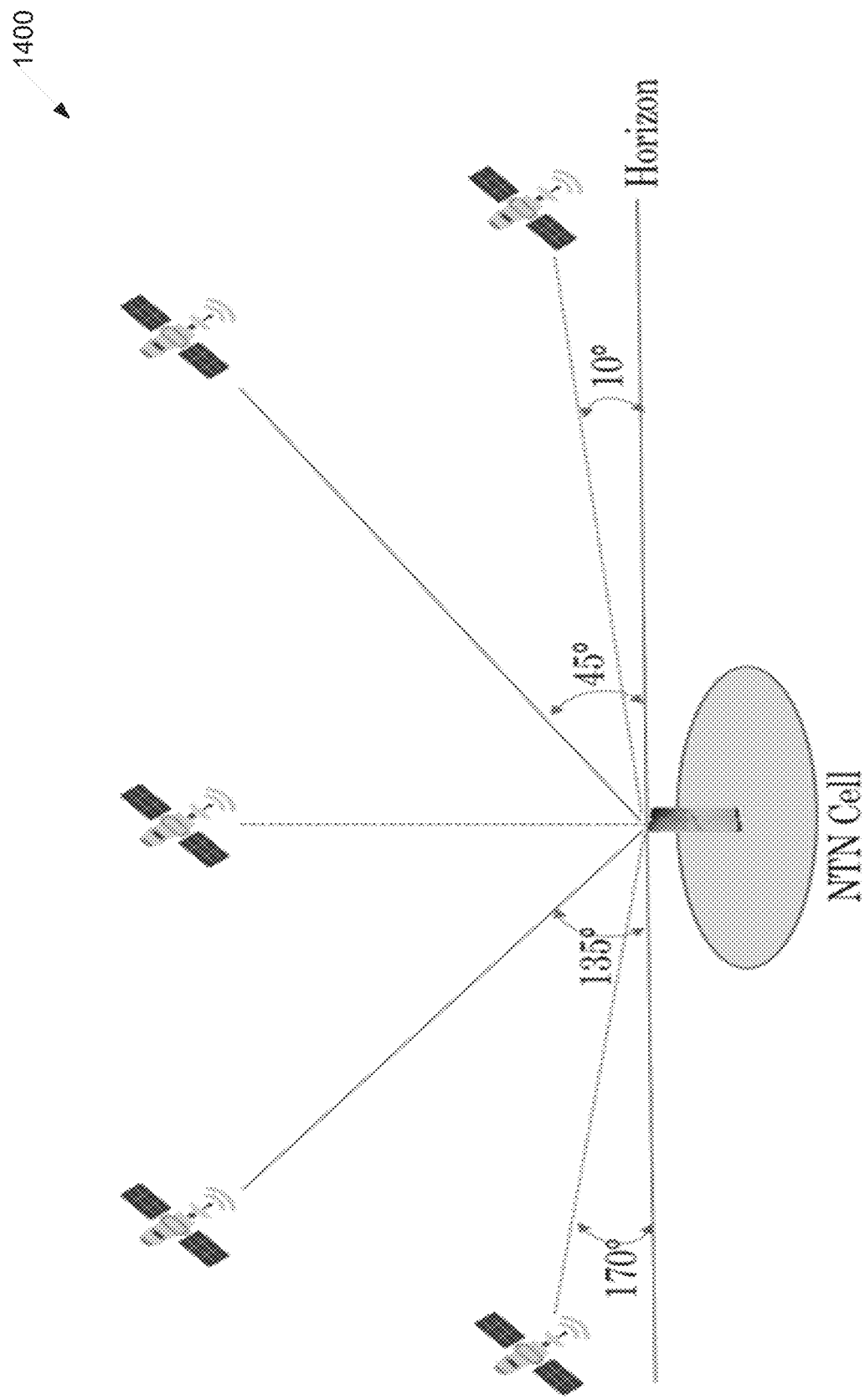
FIG. 14 illustrates an example impact of satellite altitude on the propagation delay for non-GEO satellite with earth-fixed beam according to embodiments of the present disclosure.

FIG. 14 illustrates an example impact of satellite altitude on the propagation delay for non-GEO satellite with earth-fixed beam 1400 according to embodiments of the present disclosure. An embodiment of the impact of satellite altitude on the propagation delay for non-GEO satellite with earth-fixed beam 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

FIG. 14 shows the associated description below for the motivation behind such reconfiguration.

In one example of adaptive modulation and coding, different modulation and coding scheme (MCS) tables can be defined to support different goals such as high throughput or higher reliability (i.e., low spectral efficiency). Alternatively, channel quality indicator (CQI) offsets can be defined to use a given CQI table to emphasize throughput or reliability. A given CQI value is associated with a certain MCS for a target block error rate. When the average channel conditions are good or are expected to be good (i.e., high signal to interference plus noise ratio (SINR)) in the near future (e.g., next tens of ms), an MCS table associated with high throughput can be used for suitable QoS Flows. When the average channel conditions are poor or are expected to be poor (i.e., low SINR) in the near future, an MCS table associated with low spectral efficiency and hence increased reliability can be used for suitable QoS Flows.

FIG. 14 shows impact of the satellite altitude on the propagation delay for Non-GEO satellites with earth-fixed beams.

When the satellite is at the nadir (i.e., directly above the center of the NTN cell on the ground), the satellite altitude is the lowest, and the propagation delay between the satellite and the NTN UE is the shortest. In contrast, when the satellite is near the horizon (e.g., the elevation angle of 10 degrees), the satellite altitude is the highest and the propagation delay between the satellite and the NTN UE is the longest.

Consider a LEO satellite at the altitude of 1500 km. The one-way propagation delay between the NTN UE and the LEO satellite could vary from about 5 ms at the nadir (i.e., the elevation angle of 90°) to about 12 ms at the elevation angle of 10° (Table 5.3.4.1-1 as illustrated in TR38.811). One way to address such delay variation in a HARQ process is to choose a large value for HARQ ACK delay based on the worst-case propagation delay. A more efficient way is to choose the HARQ ACK delay based on the satellite altitude and satellite elevation angle.

In one example, a larger HARQ ACK delay value can be used when the satellite elevation angle is between 0° (or 10°) and 45° or between 135° and 180° (or 170°). The approximate altitude and elevation angles can be easily determined based on the satellite ephemeris. A smaller HARQ ACK delay value can be used when the satellite elevation angle is between 45° and 135°. Such adaptive setting of HARQ ACK delay enables the gNB to respond more quickly and improve throughput.

Figure 15:
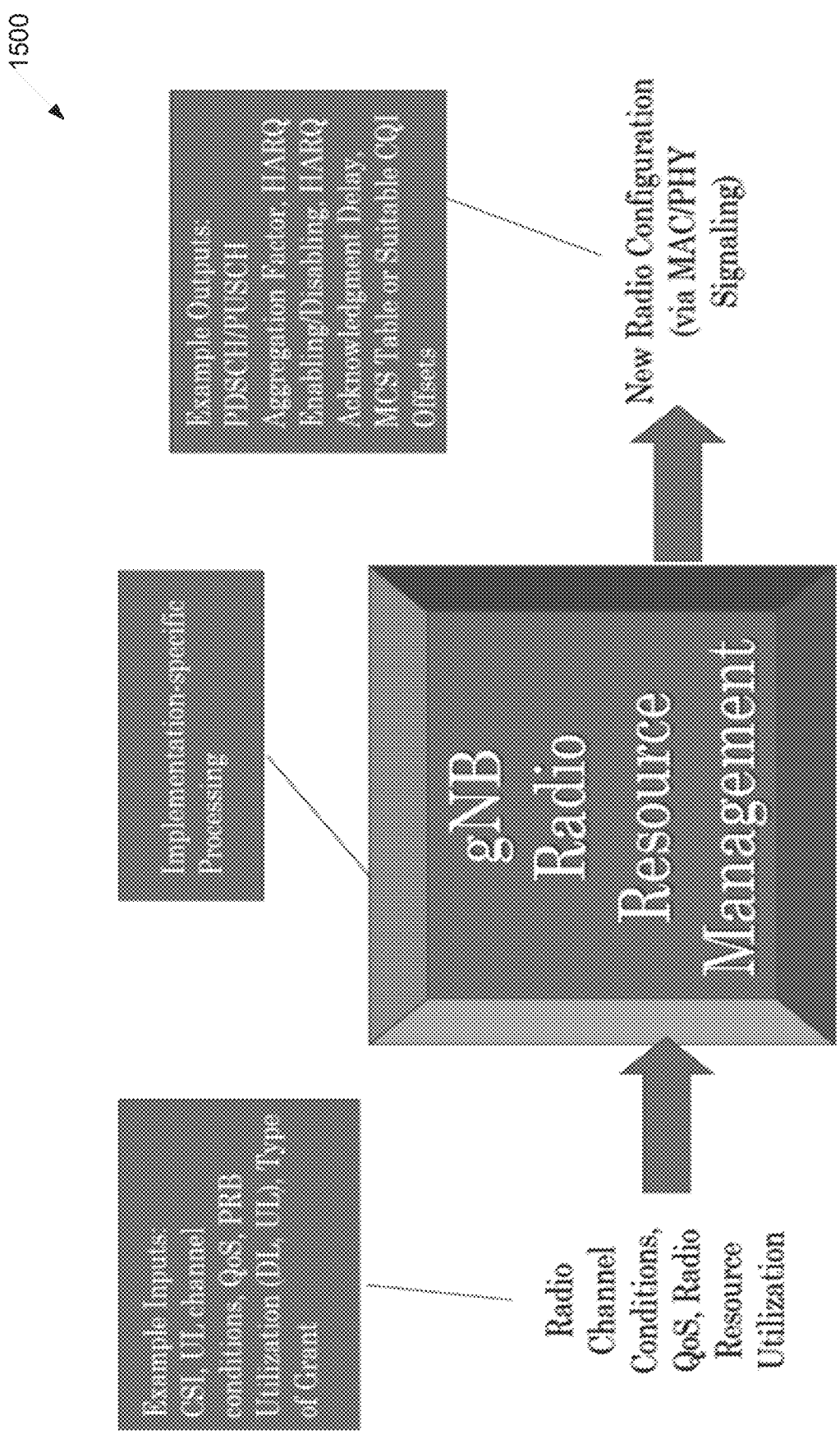
FIG. 15 illustrates an example overall mechanism of fast radio reconfiguration according to embodiments of the present disclosure.

FIG. 15 illustrates an example overall mechanism of fast radio reconfiguration 1500 according to embodiments of the present disclosure. An embodiment of the overall mechanism of fast radio reconfiguration 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

Figure 16:
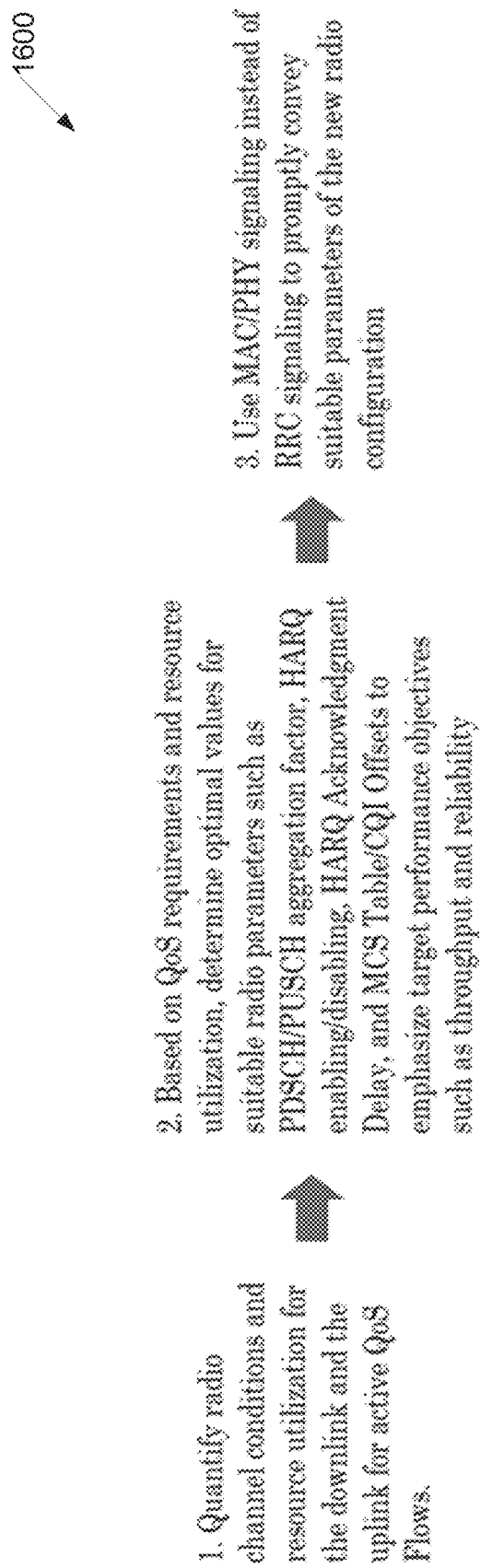
FIG. 16 illustrates an example overall steps of resource management according to embodiments of the present disclosure.

FIG. 16 illustrates an example of overall steps of resource management 1600 according to embodiments of the present disclosure. An embodiment of the overall steps of resource management 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

In one embodiment, for innovations in gNB implementations, the use of faster MAC and PHY signaling enables the gNB to design implementation-specific algorithms to make the most of available radio resources. This fast signaling flexibility encourages gNB design innovations. For example, the gNB or the gNB-DU can quickly exploit the provided MAC/PHY signaling to modify parameters related to PDSCH/PUSCH aggregation, HARQ, and adaptive modulation and coding in an implementation-specific manner.

In one embodiment, for increased reliability, increased degree of PDSCH/PUSCH aggregation and/or more conservative MCS table can used to provide more redundancy, increasing the reliability.

In one embodiment, for higher throughput, reduced degree of PDSCH/PUSCH aggregation, more aggressive MCS table, and adaptive HARQ delay can be used to increase spectral efficiency and hence throughput.

This disclosure provides a new handover mechanism to enable faster and more reliable handover for a non terrestrial network (NTN). In an NTN, due to long propagation delays, RRC signaling is much slower compared to a terrestrial network. Such slow signaling may lead to more radio connection failures during the process of handover. Faster detection of a suitable handover candidate through measurements helps accelerate the process of handover for an NTN. While traditional handover related measurement events essentially require a neighbor cell to be better than the currently serving cell, this feature utilizes the absolute difference between the serving cell measurement (e.g., RSRP, reference signal received quality (RSRQ), and/or SINR) and the neighboring cell measurement to trigger an event-based measurement report.

To minimize the ping-pong between two NTN cells and to encourage handover to the correct NTN cell based on the NTN cell movement, satellite movement-based hysteresis is introduced. To further ensure suitability of the neighboring cell for handover, the neighboring cell's measurement can additionally be compared against an absolute threshold. The gNB/eNB can use the measurement report and knowledge of the NTN cell movement to make the handover decision.

In an NTN, depending upon the NTN type (e.g., GEO with a transparent payload vs. LEO with a gNB on the satellite), propagation delays could be few milliseconds or even hundreds of milliseconds. Such long propagation delays in an NTN lead to a significant delay in detection of a suitable candidate cell for handover and a significant difference between (i) the time the measurement report is sent and (ii) the time a handover command is received by the UE. Such long delays increase the probability of degradation in radio channel conditions and loss of the radio connection, adversely affecting user experience.

In a terrestrial network, the propagation delays are typically quite short (e.g., few microseconds). Furthermore, LTE and 5G allow fast exchange of signaling messages. Hence, the overall handover processing could be completed in just few milliseconds in a terrestrial network. However, in an NTN, propagation delays could be few milliseconds or even hundreds of milliseconds. Because of long propagation delays in an NTN, it takes a long time for the UE's measurement report to reach the source base station.

Furthermore, it takes time for the handover command from the source BS to arrive at the UE. Due to long delays, by the time the source BS sends a handover command to the UE, the channel conditions in the source cell may have deteriorated significantly, leading to the loss of the handover command and subsequently loss of the radio connection. Furthermore, since handover is delayed, the UE experiences degraded SINR for a relatively longer time period, reducing the throughput.

If a handover can be accelerated in an NTN, the radio connection can be maintained during handover and degradation in user experience can be minimized.

The feature accelerates the overall handover for an NTN by defining a new measurement reporting event. This event allows the UE to detect a neighboring cell that is qualified to be a good handover candidate although it may or may not be better than the currently serving cell at the time the event occurs.

Figure 17:
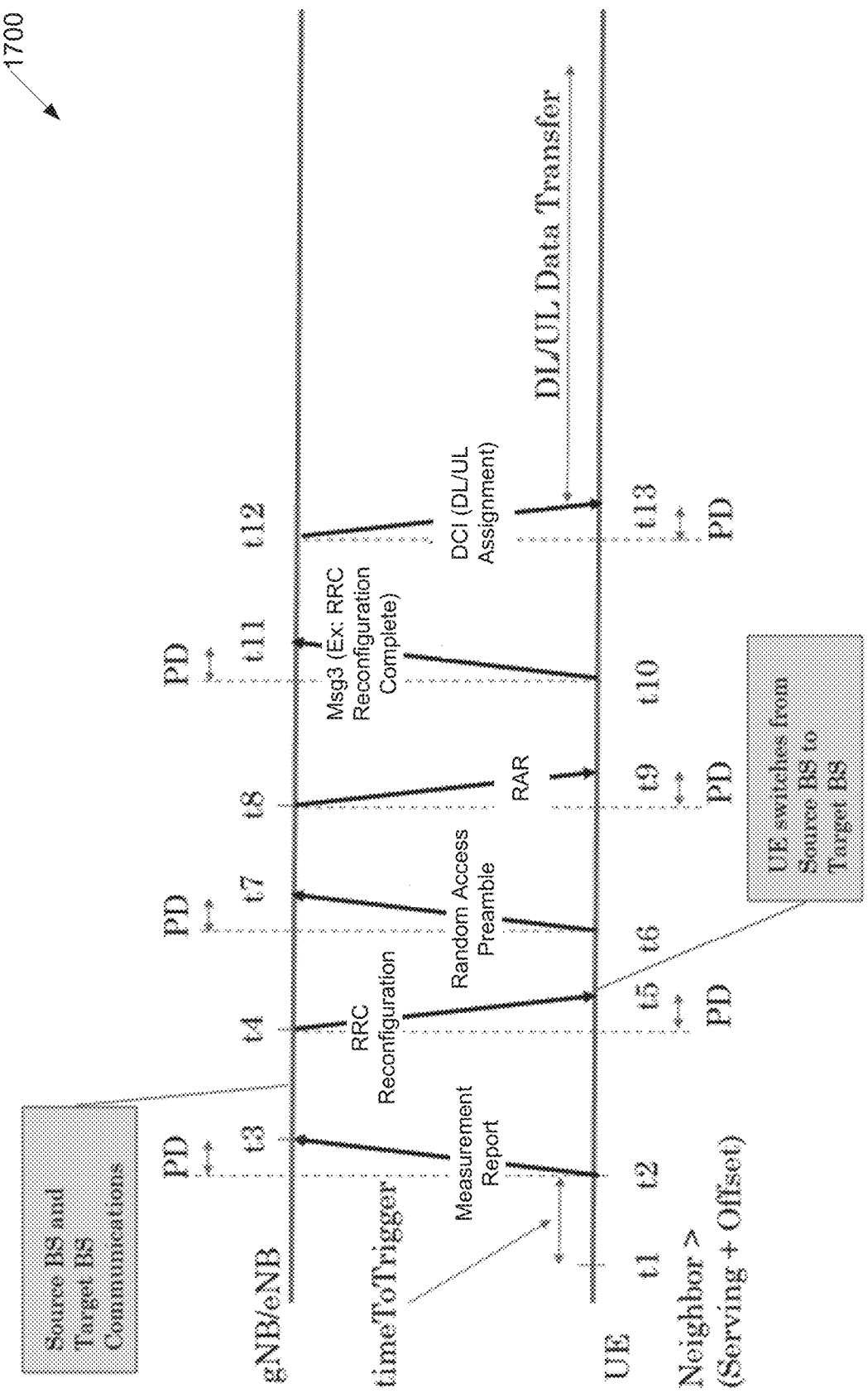
FIG. 17 illustrates an example handover timeline in a terrestrial network according to embodiments of the present disclosure.

FIG. 17 illustrates an example handover timeline in a terrestrial network 1700 according to embodiments of the present disclosure. An embodiment of the handover timeline in a terrestrial network 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions.

Consider handover in a terrestrial network. FIG. 17 illustrates a timeline for a measurement event (so-called event A3) used in LTE and 5G. According to event A3, the UE sends a measurement report when the neighboring cell becomes an offset better than the serving cell and stays better than the serving cell for the duration of timeToTrigger.

As illustrated in FIG. 17, at time t2, event A3 occurs, and then the UE sends a measurement report containing the measurements of the serving cell and the candidate cell. The gNB/eNB makes a handover decision, gets the approval of the target gNB/eNB and sends a handover command to the UE at time t4 in the form of an RRC message such as RRC reconfiguration. The UE stops communicating with the source cell/base station and initiates the random access procedure toward the target cell/BS by sending a RA preamble at t6.

The target BS replies with a random access response and includes a timing adjustment to facilitate UL synchronization and UL resource allocation in the form of a grant. The UE sends an RRC reconfiguration complete message (so-called Msg3 or Message 3) at time t10 using the allocated UL grant to complete the handover process. In a gNB/eNB implementation, the gNB/eNB allocates DL/UL resources after receiving Msg3. Since a UE with a transceiver (TRX) communicates with a single cell on a given carrier frequency, data transfer cannot occur for such UEs between t5 and t13.

In a terrestrial network, the propagation delays (referred as PD in FIG. 17) are typically quite short (e.g., few microseconds). Furthermore, LTE and 5G allow fast exchange of signaling messages. Hence, the processing between t2 and t13 could be completed in just few milliseconds in a terrestrial network. However, in an NTN, depending upon the NTN Type (e.g., GEO with a transparent payload vs. LEO with a gNB on the satellite), PD could be few milliseconds or even hundreds of milliseconds. Such long propagation delays in an NTN leads to a significant difference between t2 and t3, increasing the probability of degradation in radio channel conditions and loss of the radio connection, adversely affecting user experience. If handover can be accelerated in an NTN, the radio connection can be maintained during handover and degradation in user experience can be minimized.

Figure 18:
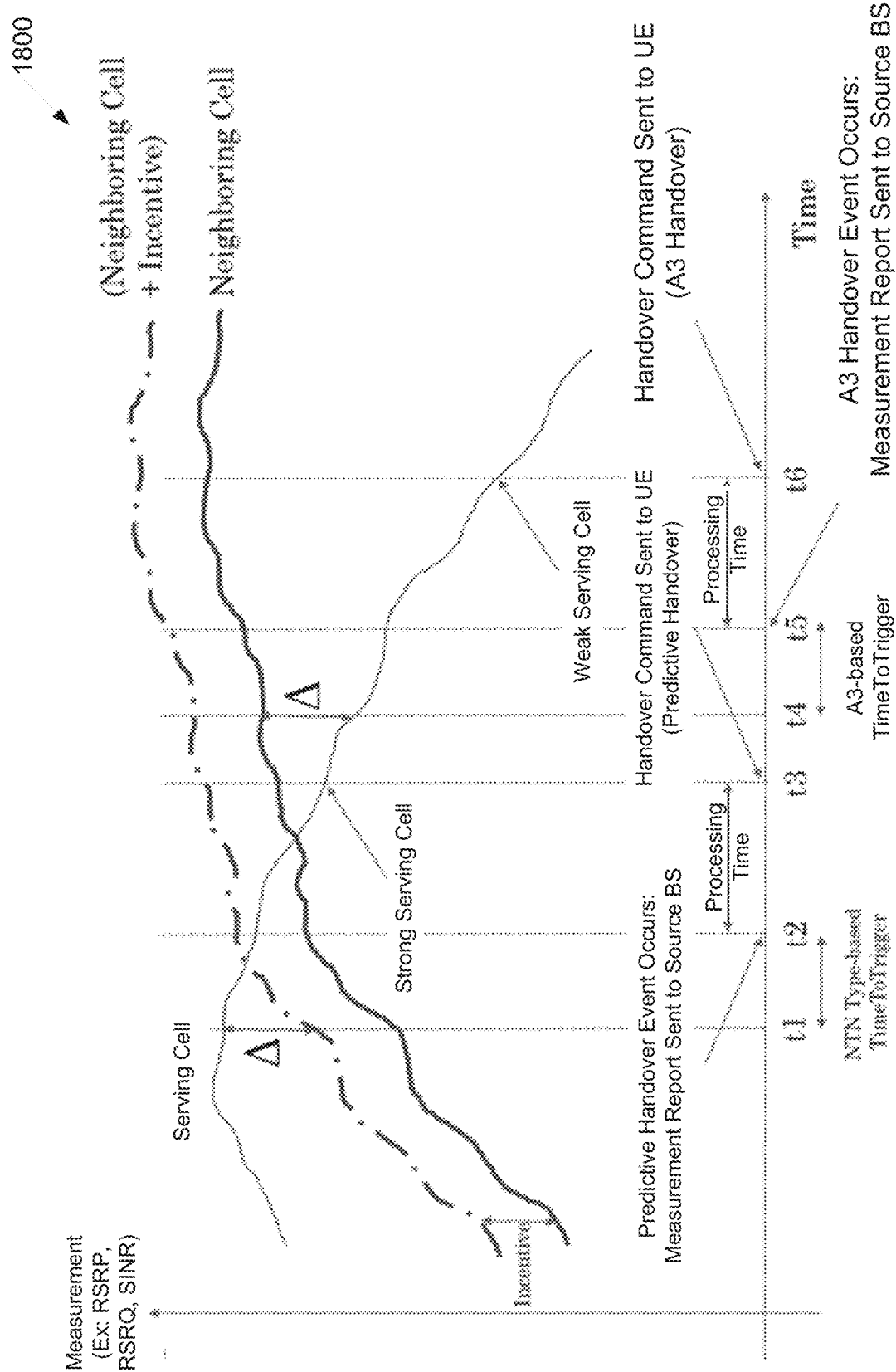
FIG. 18 illustrates an example predictive and accelerated handover according to embodiments of the present disclosure.

FIG. 18 illustrates an example predictive and accelerated handover 1800 according to embodiments of the present disclosure. An embodiment of the predictive and accelerated handover 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions.

FIG. 18 illustrates how predictive handover can be realized by accelerating the detection of a suitable neighbor cell (e.g., compared to A3-based handover), while ensuring that (i) the new neighboring cell can provide at least a certain level of service and (ii) the currently serving cell would not cause excessive interference when handover is completed. Furthermore, the predictive handover can additionally exploit the knowledge of the movement of NTN cells to encourage handover toward the NTN cell that is expected to become better in the very near future (e.g., within next few milliseconds).

In the provided predictive and accelerated handover as illustrated in FIG. 18, the UE sends a measurement report when the absolute difference between (i) (neighbor cell measurement+incentive) and (ii) (serving cell measurement) is below the threshold Δ for the period of timeToTrigger. In FIG. 18, the UE sends a measurement report at time t2 and the BS sends the handover command at time t3. Observe that the currently serving cell is still reasonably strong at t3 when the handover command is sent by the serving cell to the UE.

To further ensure suitability of the neighboring cell for handover, the neighboring cell's measurement can additionally be compared against an absolute threshold such as (neighbor cell measurement>absolute threshold). In such case, the measurement differential condition and the absolute threshold condition can be combined using a logical "AND" operation.

Now, compare t2 with t5 and t3 with t6. In the traditional A3-based handover, the UE sends a measurement report at time t5. Hence, the neighboring cell is detected (t5-t2) milliseconds earlier. Furthermore, the handover command is sent (t6-t3)ms earlier. Further observe that the serving cell is much weaker at time t6 compared than at time t3, increasing the probability that a handover command may not be reliably detected by the UE.

The parameter incentive is an incentive based on the satellite movement. It can be set to a positive value for an NTN cell that is a preferred cell due to a movement toward the UE. For example, if an NTN cell is moving toward the UE, incentive can be set to a positive value to encourage handover toward such neighbor cell, because the radio environment is expected to become better in the near-term future for such cell. In contrast, incentive can be set to a negative value if the neighboring cell is going away from the UE to discourage handover to such cell, because the radio channel conditions are expected to become worse in the near-term future for such cell.

The gNB/eNB can set parameters such as Incentive and A per neighboring cell via RRC signaling based on the knowledge of the movement of NTN cells per satellite ephemeris.

In addition to the parameter incentives and A, other traditional parameters such as cell-specific and frequency-specific offsets for serving and neighbor cells can also be incorporated in the event criterion specified above.

Figure 19:
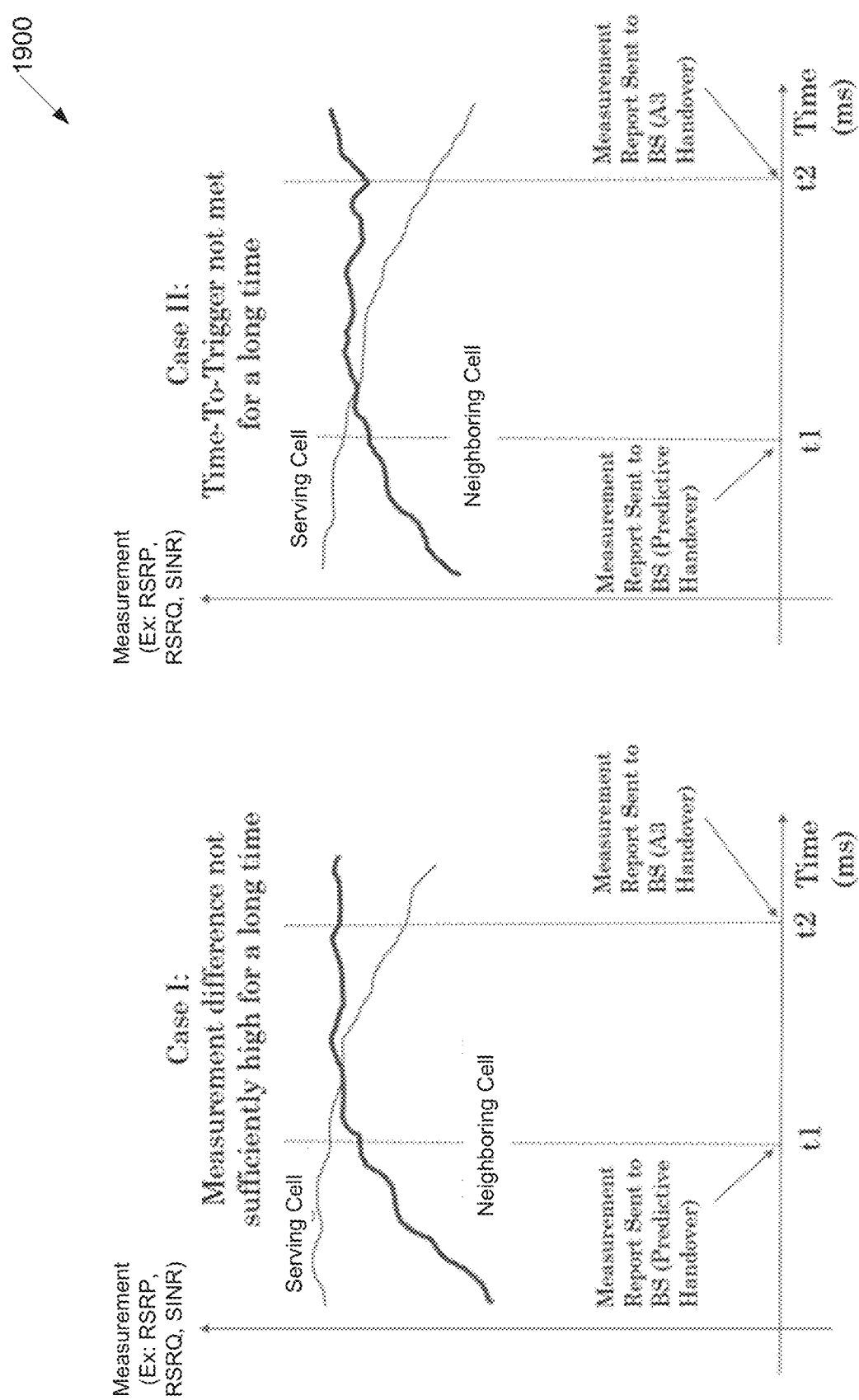
FIG. 19 illustrates an example scenario of accelerated handover compared to traditional A3-based handover according to embodiments of the present disclosure.

FIG. 19 illustrates an example scenario of accelerated handover compared to traditional A3-based handover 1900 according to embodiments of the present disclosure. An embodiment of the scenario of accelerated handover compared to traditional A3-based handover 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions.

FIG. 19 illustrates scenarios where the provided predictive handover would result in an accelerated handover compared the traditional A3-based handover and scenarios of accelerated handover compared to traditional A3-based handover.

In case I, the measurement difference between the neighboring cell and the serving cell is not large enough for the A3 event to occur. However, predictive handover criterion is easily met, and then the UE is able to report the handover event much earlier compared to A3-based event.

In case II, the time-to-trigger condition is not satisfied for a long time for the A3-based event, potentially due to oscillating measurements. However, predictive handover criterion is readily met, and then the UE reports the handover event much earlier compared to A3-based event.

Figure 20:
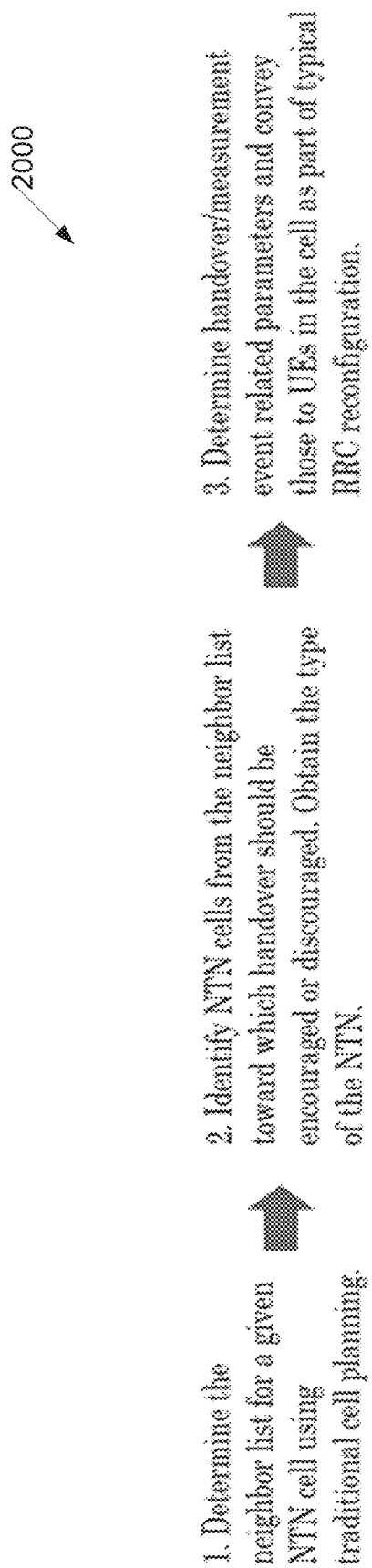
FIG. 20 illustrates an example handover management in NTN according to embodiments of the present disclosure.

FIG. 20 illustrates an example handover management in a non terrestrial network (NTN) 2000 according to embodiments of the present disclosure. An embodiment of the handover management in the non terrestrial network (NTN) 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions.

Figure 21:
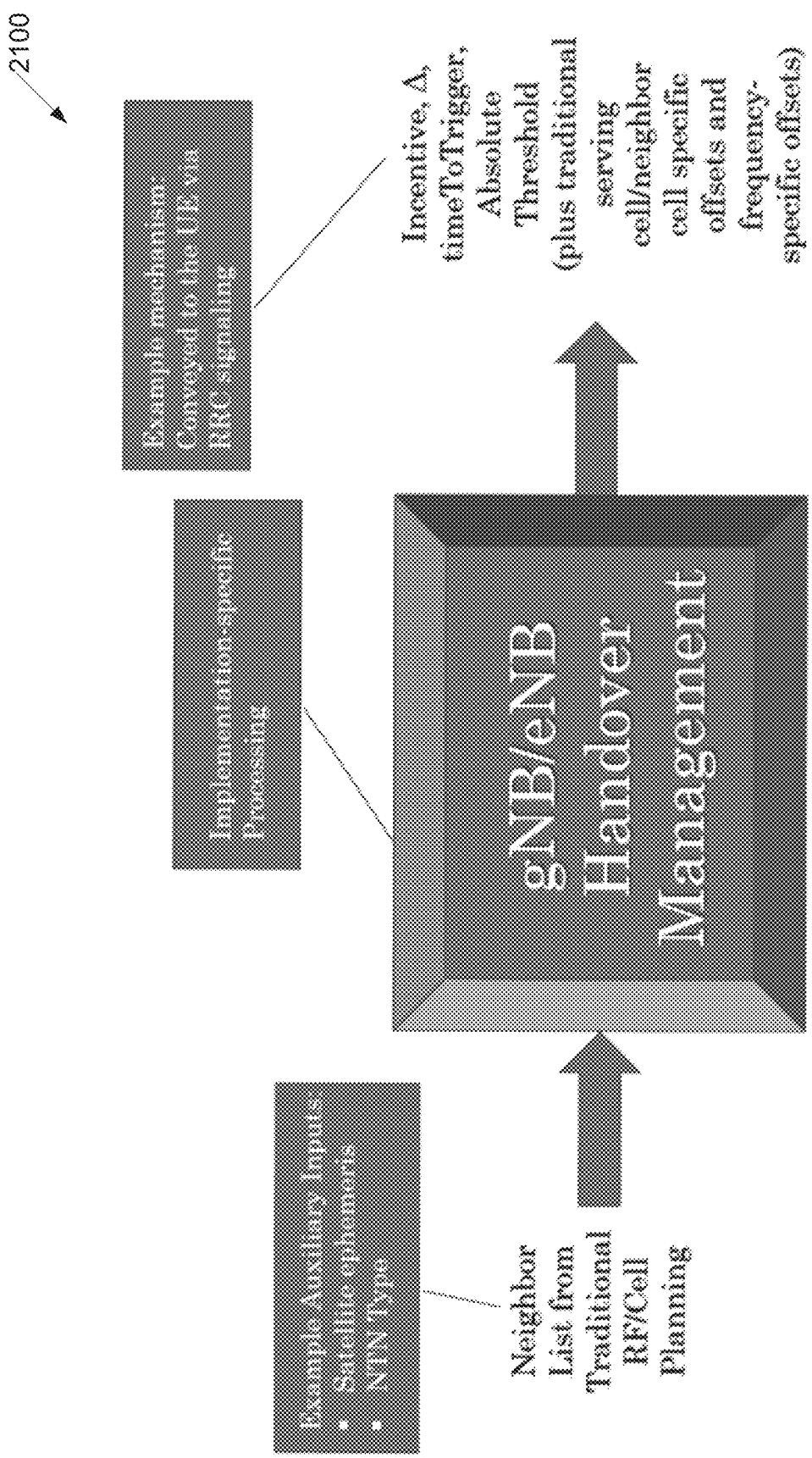
FIG. 21 illustrates an example overall steps of handover management in NTN according to embodiments of the present disclosure.

FIG. 21 illustrates an example of overall steps of handover management in NTN 2100 according to embodiments of the present disclosure. An embodiment of the overall steps of handover management in NTN 2100 shown in FIG. 21 is for illustration only. One or more of the components illustrated in FIG. 21 can be implemented in specialized circuitry configured to perform the noted functions or one or more of the components can be implemented by one or more processors executing instructions to perform the noted functions.

FIG. 20 shows the overall mechanism of predictive and accelerated handover for an example embodiment of the disclosure.

In one embodiment, for increased handover success rate, since the handover command is sent to the UE while the serving cell's radio environment is reasonably good, the UE can detect the handover command reliably. Additionally, when the UE attempts to connect with the neighbor cell, the radio environment is conducive as well. Hence, the overall success rate of handover would be high in spite of long propagation delays in an NTN.

In one embodiment, for higher throughput, since the data transfer continues to occur in reasonably good channel conditions in the previously serving cell as well as the new serving cell, high throughput can be expected for the predictive handover.

In one embodiment, for reduced ping-pong and reduced signaling, due to the satellite movement-based incentive (or counter-incentive), ping-pong between two NTN cells is reduced in predictive handover, leading to savings in overall amount of signaling and increased reliability of handover.

Figure 22:
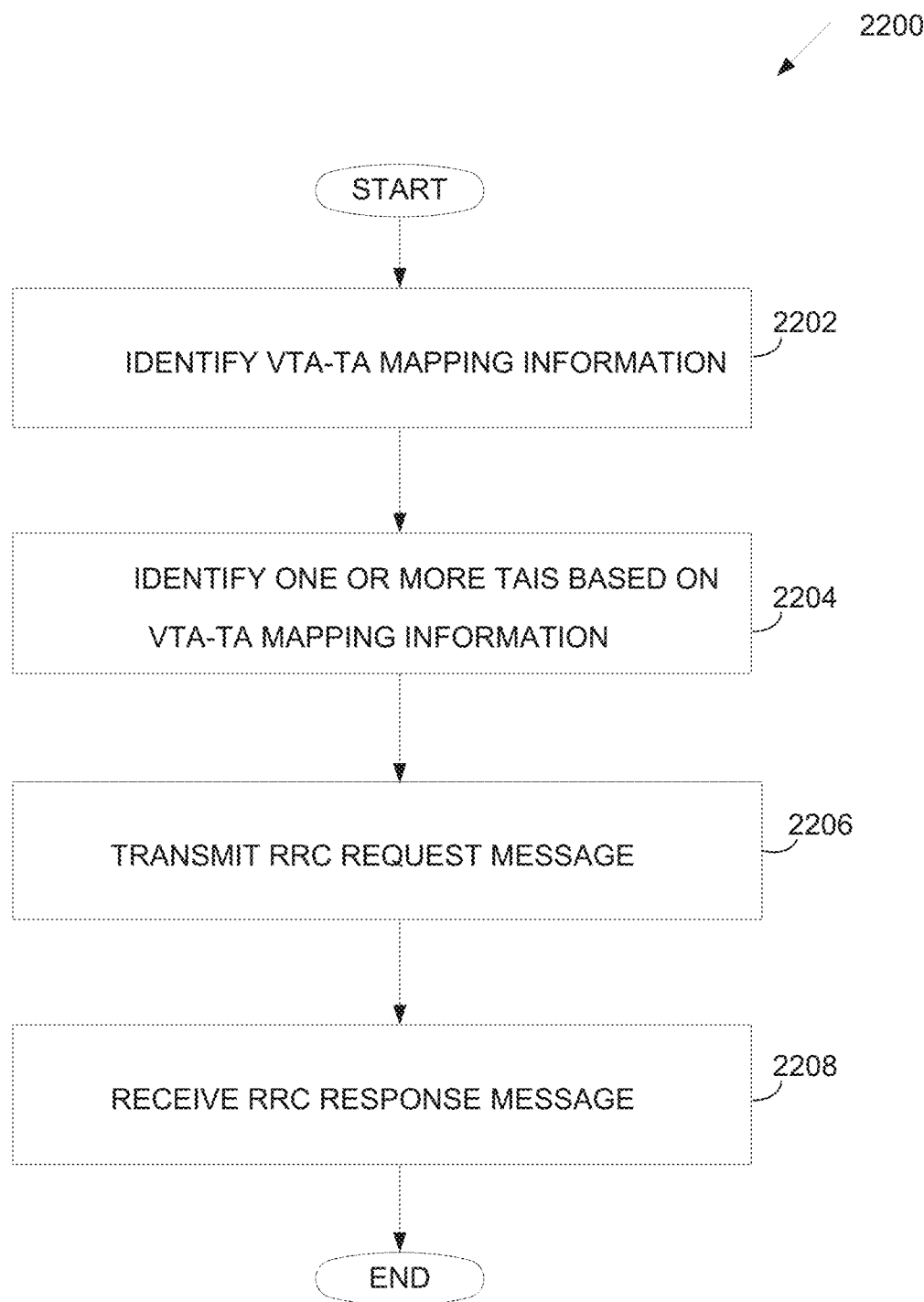
FIG. 22 illustrates a flow chart of a method for virtual tracking and registration areas according to embodiments of the present disclosure.

FIG. 22 illustrates a flow chart of a method 2200 for virtual tracking and registration areas according to embodiments of the present disclosure, as may be performed by a UE (111-116 as illustrated in FIG. 1). An embodiment of the method 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions.

As illustrated in FIG. 22, the method 2200 begins at step 2202. In step 2202, the UE identifies a VTA-TA mapping information indicating mappings between (i) TAIs associated with a non-terrestrial network (NTN) entity and (ii) VTAs associated with geographical areas as a function of time.

Subsequently, the UE in step 2204 identifies one or more TAIs at an instant or during a time period based on the VTA-TA mapping information.

Next, the UE in step 2206 transmits an RRC request message including the one or more TAIs.

Finally, the UE in step 2208 receives an RRC response message corresponding to the RRC request message based on the one or more TAIs, wherein the RRC response message includes a VRA.

In one embodiment, the UE receives the VTA-TA mapping information via licensed spectrum, unlicensed spectrum, or shared spectrum, and transmits, using the RRC request message, measurement results corresponding to a serving cell where the UE belongs to based on the one or more TAIs, the measurement results further corresponding to one or more neighbor cells when the UE detects the one or more neighbor cells.

In one embodiment, the UE determines or updates the VTA-TA mapping information based on information received from the NTN entity via a dedicated signaling or a broadcast signaling including SIB s, or a MBMS; or determines or updates the VTA-TA mapping information based on information received from a TN entity via the dedicated signaling or the broadcast signaling including SIBs, or the MBMS.

In one embodiment, the UE transmits the RRC request message including location information of the UE associated with a timestamp in a form of at least one of a global cell ID or GNSS-based UE location to enable the NTN entity to identify the VTA or a set of VTAs that the VRA covers.

In such embodiments, the RRC request message is a first RRC-encapsulated non-access stratum (NAS) signaling message for a registration and attach request; the RRC response message is a second RRC-encapsulated NAS signaling message for a registration and attach accept; and the timestamp is used, by an NTN entity, to identify the set of VTAs and the VRA based on the VTA-TA mapping information.

In one embodiment, the UE receives the VTA-TA mapping information using a NAS signaling message including a registration accept message, an attach accept message, a downlink NAS transport message or a TAU message; and receives a TAI list corresponding to a regular registration area or the VRA, wherein common information for the one or more TAIs of the TAI list is separately identified to enable compact representation of information related to the one or more TAIs in the TAI list.

In one embodiment, the UE detects a change in the VRA for a mobility registration update using a TAI list associated with the VRA; and, in response to detecting the change in the VRA, transmits the RRC request message containing a NAS signaling message that includes a registration request or a TAU request, wherein the NAS signaling message includes a TAI, a version number of the VTA-TA mapping information, and a timestamp.

In one embodiment, the UE receives system information to obtain a compact neighbor list and a set of parameters associated with the compact neighbor list and movement-based offsets when an RRC state of the UE is an RRC idle state or an RRC inactive state, wherein the processor is further configured to perform a cell search and a cell reselection based on the received system information; or receives the set of parameters associated with the compact neighbor list and the movement-based offsets when the RRC state of the UE is an RRC connected state via a dedicated signaling, wherein the processor is further configured to identify measurement results to be transmitted to the NTN entity.

In one embodiment, the UE searches for cells in the compact neighbor list based on an indication from the NTN entity; identifies a movement offset value associated with the cells in the compact neighbor list, wherein the movement offset value is selected based on movement of the NTN entity; and determines a rank of neighbor cells in the compact neighbor list for a cell reselection based on the movement offset value and cell measurement information.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
  a processor configured to:
    identify virtual tracking area (VTA) to tracking area (TA) (VTA-TA) mapping information indicating mappings between (i) TA identifiers (TAIs) associated with a non-terrestrial network (NTN) entity and (ii) VTAs associated with geographical areas as a function of time, wherein the VTA-TA mapping information is identified based on:
      information received from the NTN entity via a dedicated signaling or a broadcast signaling including system information blocks (SIBs), or a multimedia broadcast multicast service (MBMS), or
      information received from a terrestrial network (TN) entity via the dedicated signaling or the broadcast signaling including the SIBs, or the MBMS; and
    identify one or more TAIs at an instant or during a time period based on the VTA-TA mapping information; and
  a transceiver operably coupled to the processor, the transceiver configured to:
    transmit a radio resource control (RRC) request message including the one or more TAIs; and
    receive an RRC response message corresponding to the RRC request message based on the one or more TAIs, wherein the RRC response message includes a virtual registration area (VRA).

2. The UE of claim 1, wherein the transceiver is further configured to:
  receive the VTA-TA mapping information via licensed spectrum, unlicensed spectrum, or shared spectrum, and
  transmit, using the RRC request message, measurement results corresponding to a serving cell where the UE belongs to based on the one or more TAIs, the measurement results further corresponding to one or more neighbor cells when the UE detects the one or more neighbor cells.

3. The UE of claim 1, wherein:
  the transceiver is further configured to transmit the RRC request message including location information of the UE associated with a timestamp in a form of at least one of a global cell identifier (ID) or global navigation satellite system (GNSS)-based UE location to enable the NTN entity to identify the VTA or a set of VTAs that the VRA covers;
  the RRC request message is a first RRC-encapsulated non-access stratum (NAS) signaling message for a registration and attach request;

the RRC response message is a second RRC-encapsulated NAS signaling message for a registration and attach accept; and the timestamp is used for identification of the set of VTAs and the VRA based on the VTA-TA mapping information.

4. The UE of claim 1, wherein the transceiver is further configured to:
receive the VTA-TA mapping information using a NAS signaling message including a registration accept message, an attach accept message, a downlink NAS transport message or a tracking area update (TAU) message; and
receive a TAI list corresponding to a regular registration area or the VRA,
wherein common information for the one or more TAIs of the TAI list is separately identified to enable compact representation of information related to the one or more TAIs in the TAI list.

5. The UE of claim 1, wherein:
the processor is further configured to detect a change in the VRA for a mobility registration update using a TAI list associated with the VRA,
the transceiver is further configured to, in response to detecting the change in the VRA, transmit the RRC request message containing a NAS signaling message that includes a registration request or a TAU request,
the NAS signaling message includes a TAI, a version number of the VTA-TA mapping information, and a timestamp.

6. The UE of claim 1, wherein the transceiver is further configured to:
receive system information to obtain a compact neighbor list and a set of parameters associated with the compact neighbor list and movement-based offsets when an RRC state of the UE is an RRC idle state or an RRC inactive state, wherein the processor is further configured to perform a cell search and a cell reselection based on the received system information; or
receive the set of parameters associated with the compact neighbor list and the movement-based offsets when the RRC state of the UE is an RRC connected state via a dedicated signaling, wherein the processor is further configured to identify measurement results to be transmitted to the NTN entity.

7. The UE of claim 6, wherein the processor is further configured to:
search for cells in the compact neighbor list based on an indication from the NTN entity;
identify a movement offset value associated with the cells in the compact neighbor list, wherein the movement offset value is selected based on movement of the NTN entity; and
determine a rank of neighbor cells in the compact neighbor list for a cell reselection based on the movement offset value and cell measurement information.

8. A base station (BS) in a wireless communication system, the BS comprising:
a processor; and
a transceiver operably coupled to the processor, the transceiver configured to:
receive, from a user equipment (UE), a radio resource control (RRC) request message including one or more tracking area identities (TAIs) identified at an instant or during a time period base on virtual tracking area (VTA) to tracking area (TA) (VTA-TA) mapping information that indicates mappings between (i) TAIs associated with a non-terrestrial network (NTN) entity and (ii) VTAs associated with geographical areas as a function of time, wherein the VTA-TA mapping information is indicated based on:
information transmitted from the NTN entity via a dedicated signaling or a broadcast signaling including system information blocks (SIBs), or a multimedia broadcast multicast service (MBMS), or
information transmitted from a terrestrial network (TN) entity via the dedicated signaling or the broadcast signaling including the SIBs, or the MBMS; and
transmit, to the UE, an RRC response message corresponding to the RRC request message based on the one or more TAIs, wherein the RRC response message includes a virtual registration area (VRA), and
wherein the RRC request message and the RRC response message include a non-access stratum (NAS) signaling message.

9. The BS of claim 8, wherein the transceiver is further configured to:
transmit the VTA-TA mapping information via licensed spectrum, unlicensed spectrum, or shared spectrum;
receive, using the RRC request message, measurement results corresponding to a serving cell where the UE belongs to based on the one or more TAIs, the measurement results further corresponding to one or more neighbor cells when the UE detects the one or more neighbor cells; and
transmit, to the NTN entity, a message based on the received RRC request message, wherein the message for the NTN entity includes UE location information in a form of at least one of a global cell identifier (ID), the one or more TAIs, or a global navigation satellite system (GNSS)-based UE location.

10. The BS of claim 8, wherein the transceiver is further configured to receive location information of the UE associated with a timestamp in a form of at least one of a global cell ID, the one or more TAIs, or a GNSS-based UE location to enable the NTN entity to identify the VTA or a set of VTAs that a virtual registration area (VRA) covers;
the RRC request message is a first RRC-encapsulated NAS signaling message for a registration and attach request;
the RRC response message is a second RRC-encapsulated NAS signaling message for a registration and attach accept; and
the timestamp is used for identification of the set of VTAs and the VRA based on the VTA-TA mapping information.

11. The BS of claim 8, wherein the transceiver is further configured to:
transmit a TAI list corresponding to a regular registration area or the VRA, wherein common information for the one or more TAIs of the TAI list being is separately identified to enable compact representation of information related to the one or more TAIs in the TAI list; and
transmit the VTA-TA mapping information using the NAS signaling message that includes a registration accept message, an attach accept message, or a tracking area update (TAU) message.

12. The BS of claim 8, wherein the transceiver is further configured to:
receive the NAS signaling message including a registration request or a TAU request;

receive the RRC request message encapsulating the NAS signaling message that includes a TA ID, a version number of the VTA-TA mapping information, and a timestamp; and receive a TA change-based TA update information if the UE detects a change in the VRA.

13. A method of a user equipment (UE) in a wireless communication system, the method comprising:

identifying virtual tracking area (VTA) to tracking area (TA) (VTA-TA) mapping information indicating mappings between (i) TA identifiers (TAIs) associated with a non-terrestrial network (NTN) entity and (ii) VTAs associated with geographical areas as a function of time, wherein the VTA-TA mapping information is identified based on:

information received from the NTN entity via a dedicated signaling or a broadcast signaling including system information blocks (SIBs), or a multimedia broadcast multicast service (MBMS), or information received from a terrestrial network (TN) entity via the dedicated signaling or the broadcast signaling including the SIBs, or the MBMS;

identifying one or more TAIs at an instant or during a time period based on the VTA-TA mapping information;

transmitting a radio resource control (RRC) request message including the one or more TAIs; and receiving an RRC response message corresponding to the RRC request message based on the one or more TAIs, wherein the RRC response message includes a virtual registration area (VRA).

14. The method of claim 13, further comprising:

receiving the VTA-TA mapping information via licensed spectrum, unlicensed spectrum, or shared spectrum; and transmitting, using the RRC request message, measurement results corresponding to a serving cell where the UE belongs to based on the one or more TAIs, the measurement results further corresponding to one or more neighbor cells when the UE detects the one or more neighbor cells.

15. The method of claim 13, further comprising:

transmitting the RRC request message including location information of the UE associated with a timestamp in a form of at least one of a global cell identifier (ID) or global navigation satellite system (GNSS)-based UE location to enable the NTN entity to identify the VTA or a set of VTAs that the VRA covers, wherein:

the RRC request message is a first RRC-encapsulated non-access stratum (NAS) signaling message for a registration and attach request;

the RRC response message is a second RRC-encapsulated NAS signaling message for a registration and attach accept; and the timestamp is used for identification of the set of VTAs and the VRA based on the VTA-TA mapping information.

16. The method of claim 13, further comprising:

receiving the VTA-TA mapping information using a NAS signaling message including a registration accept message, an attach accept message, a downlink NAS transport message, or a tracking area update (TAU) message;

receiving a TAI list corresponding to a regular registration area or the VRA, wherein common information for the one or more TAIs of the TAI list is separately identified to enable compact representation of information related to the one or more TAIs in the TAI list;

detecting a change in the VRA for a mobility registration update using a TAI list associated with the VRA; and in response to detecting the change in the VRA, transmitting the RRC request message containing a NAS signaling message that includes a registration request or a TAU request, wherein the NAS signaling message includes a TAI, a version number of the VTA-TA mapping information, and a timestamp.

17. The method of claim 13, further comprising:

receiving system information to obtain a compact neighbor list and a set of parameters associated with the compact neighbor list and movement-based offsets when an RRC state of the UE is an RRC idle state or an RRC inactive state, and performing a cell search and a cell reselection based on the received system information; or receiving the set of parameters associated with the compact neighbor list and the movement-based offsets when the RRC state of the UE is an RRC connected state via a dedicated signaling, and identifying measurement results to be transmitted to the NTN entity; and searching for cells in the compact neighbor list based on an indication from the NTN entity;

identifying a movement offset value associated with the cells in the compact neighbor list, wherein the movement offset value is selected based on movement of the NTN entity; and determining a rank of neighbor cells in the compact neighbor list for a cell reselection based on the movement offset value and cell measurement information.

* * * * *